(12) United States Patent
Chen et al.

(10) Patent No.: US 10,990,540 B2
(45) Date of Patent: Apr. 27, 2021

(54) MEMORY MANAGEMENT METHOD AND APPARATUS

(71) Applicant: Huawei Technologies Co., Ltd., Shenzhen (CN)

(72) Inventors: Qiulin Chen, Shanghai (CN); Wanglai Yao, Hangzhou (CN); Yunjian Ying, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 16/368,511

(22) Filed: Mar. 28, 2019

(65) Prior Publication Data

US 2019/0220418 A1 Jul. 18, 2019

Related U.S. Application Data

(63) Continuation of application No. PCT/CN2017/092855, filed on Jul. 13, 2017.

(30) Foreign Application Priority Data

Sep. 28, 2016 (CN) .......................... 201610860581.5

(51) Int. Cl.
*G06F 12/00* (2006.01)
*G06F 12/123* (2016.01)
(Continued)

(52) U.S. Cl.
CPC ............ *G06F 12/123* (2013.01); *G06F 12/02* (2013.01); *G06F 12/0246* (2013.01);
(Continued)

(58) Field of Classification Search
None
See application file for complete search history.

(56) References Cited

U.S. PATENT DOCUMENTS 5,175,834 A 12/1992 Sawai
8,904,068 B2 12/2014 Durant et al.
(Continued)

FOREIGN PATENT DOCUMENTS

CN 101403992 A 4/2009
CN 102184140 A 9/2011
(Continued)

OTHER PUBLICATIONS

Machine Translation and Abstract of Chinese Publication No. CN103150259, Jun. 12, 2013, 20 pages.
Oyama, Y., et al., "Experimental analysis of operating system jitter caused by page reclaim," XP035932703, Journal of Supercomputing, Kluwer Academic Publishers Dordrecht, NL, vol. 72, No. 5, Mar. 25, 2016, pp. 1946-1972.
Foreign Communication From a Counterpart Application, European Application No. 17854533.1, Extended European Search Report dated Aug. 14, 2019, 31 pages.
(Continued)

*Primary Examiner* — Midys Rojas
(74) *Attorney, Agent, or Firm* — Conley Rose, P.C.

(57) ABSTRACT

A memory management method and apparatus to resolve a problem that a memory reclaiming rate is relatively low, severely affecting memory allocation performance in a scenario in which system memory is insufficient. The method includes determining a memory page that needs to be swapped out of a memory, for each memory page that needs to be swapped out, generating, based on the memory page, a work task reclaiming the memory page, and allocating each work task to a dedicated worker thread for execution. In this way, a plurality of central processing units (CPUs) process memory reclaiming in parallel, thereby accelerating memory reclaiming, and improving user experience.

20 Claims, 16 Drawing Sheets

(51) Int. Cl.
*G06F 12/0882* (2016.01)
*G06F 12/02* (2006.01)
*G06F 12/08* (2016.01)

(52) U.S. Cl.
CPC .......... *G06F 12/0253* (2013.01); *G06F 12/08* (2013.01); *G06F 12/0882* (2013.01); *G06F 2212/1024* (2013.01)

(56) References Cited

U.S. PATENT DOCUMENTS

| | | |
|---|---|---|
| 2014/0075137 A1 | 3/2014 | Shin |
| 2015/0317246 A1 | 11/2015 | Xia et al. |
| 2015/0331628 A1 | 11/2015 | Lee et al. |
| 2016/0188490 A1 | 6/2016 | Samih |
| 2016/0267005 A1 | 9/2016 | Natarajan et al. |
| 2018/0157598 A1* | 6/2018 | Chan .................. G06F 12/1027 |
| 2018/0307600 A1 | 10/2018 | Wang et al. |

FOREIGN PATENT DOCUMENTS

| | | | |
|---|---|---|---|
| CN | 102231155 A | 11/2011 | |
| CN | 103150259 A | 6/2013 | |
| CN | 104461737 A | 3/2015 | |
| CN | 104620230 A | 5/2015 | |
| CN | 104881241 A | 9/2015 | |
| CN | 105159777 A | 12/2015 | |
| CN | 105701025 A | 6/2016 | |
| CN | 105740170 A | 7/2016 | |
| CN | 106155879 A | 11/2016 | |
| WO | 2014094472 A1 | 6/2014 | |

OTHER PUBLICATIONS

Machine Translation and Abstract of Chinese Publication No. CN104461737, Mar. 25, 2015, 16 pages.
Machine Translation and Abstract of Chinese Publication No. CN105159777, Dec. 16, 2015, 18 pages.
Machine Translation and Abstract of Chinese Publication No. CN105740170, Jul. 6, 2016, 12 pages.
Foreign Communication From a Counterpart Application, PCT Application No. PCT/CN2017/092855, English Translation of International Search Report dated Sep. 30, 2017, 2 pages.
Foreign Communication From a Counterpart Application, PCT Application No. PCT/CN2017/092855, English Translation of Written Opinion dated Sep. 30, 2017, 4 pages.
Machine Translation and Abstract of Chinese Publication No. CN102184140, Sep. 14, 2011, 11 pages.
Machine Translation and Abstract of Chinese Publication No. CN102231155, Nov. 2, 2011, 16 pages.
Machine Translation and Abstract of Chinese Publication No. CN104881241, Sep. 2, 2015, 25 pages.
Machine Translation and Abstract of Chinese Publication No. CN106155879, Nov. 23, 2016, 16 pages.
Foreign Communication From a Counterpart Application, Chinese Application No. 201610860581.5, Chinese Office Action dated Nov. 4, 2019, 9 pages.
Shao-Rong, W., "On Object-based Reverse Mapping," Research and Exploration in Laboratory, vol. 32 No. 1, Jan. 2013, 3 pages. With an English Abstract.

* cited by examiner

|  | Taobao | | | | | |
|---|---|---|---|---|---|---|
|  | Elapsed (s) | Sectors | Reclaim_pages | Elapsed/page (μs) | Average elapsed/page (μs) | Performance |
| Before optimization | 0.527 | 154104 | 28943 | 18.21 | 16.92 | 350% |
|  | 0.502 | 150448 | 30825 | 16.29 | | |
|  | 0.489 | 142544 | 30075 | 16.26 | | |
| After optimization | 0.168 | 177024 | 31386 | 5.35 | 4.84 | |
|  | 0.155 | 142672 | 31130 | 4.98 | | |
|  | 0.138 | 184008 | 33009 | 4.18 | | |

FIG. 9A

|  | TouTiao | | | | | |
|---|---|---|---|---|---|---|
|  | Elapsed (s) | Sectors | Reclaim_pages | Elapsed/page (μs) | Average elapsed/page (μs) | Performance |
| Before optimization | 0.322 | 82608 | 13496 | 23.86 | 23.16 | 364% |
|  | 0.315 | 88176 | 14879 | 21.17 | | |
|  | 0.332 | 83992 | 13584 | 24.44 | | |
| After optimization | 0.932 | 89504 | 15195 | 6.13 | 6.37 | |
|  | 0.087 | 82384 | 13360 | 6.51 | | |
|  | 0.084 | 82944 | 12975 | 6.47 | | |

FIG. 9B

|  | Youku | | | | | |
|---|---|---|---|---|---|---|
|  | Elapsed (s) | Sectors | Reclaim_pages | Elapsed/page (μs) | Average elapsed/page (μs) | Performance |
| Before optimization | 1.175 | 273648 | 45761 | 25.68 | 25.14 | 421% |
|  | 0.84 | 203208 | 33197 | 25.3 | | |
|  | 0.78 | 250912 | 37999 | 24.44 | | |
| After optimization | 0.226 | 264512 | 39705 | 5.69 | 5.96 | |
|  | 0.211 | 216984 | 33604 | 6.28 | | |
|  | 0.235 | 265504 | 39752 | 5.92 | | |

FIG. 9C

|  | QQLive | | | | | |
|---|---|---|---|---|---|---|
|  | Elapsed (s) | Sectors | Reclaim_pages | Elapsed/page (μs) | Average elapsed/page (μs) | Performance |
| Before optimization | 0.399 | 174568 | 26421 | 15.1 | 15.02 | 343% |
|  | 0.412 | 181864 | 27395 | 15.04 | | |
|  | 0.357 | 155024 | 23931 | 14.92 | | |
| After optimization | 0.109 | 158096 | 24068 | 4.53 | 4.38 | |
|  | 0.121 | 187568 | 28071 | 4.31 | | |
|  | 0.121 | 187400 | 28049 | 4.31 | | |

FIG. 9D

MEMORY MANAGEMENT METHOD AND APPARATUS

CROSS-REFERENCE TO RELATED APPLICATIONS

This application is a continuation of International Patent Application No. PCT/CN2017/092855 filed on Jul. 13, 2017, which claims priority to Chinese Patent 201610860581.5 filed on Sep. 28, 2016. The disclosures of the aforementioned applications are hereby incorporated by reference in their entireties.

TECHNICAL FIELD

This application relates to the field of communications technologies, and in particular, to a memory management method and apparatus.

BACKGROUND

All programs in a computer run in a memory, and the memory is a medium configured to temporarily store operation data of a central processing unit (CPU) and exchange data with an external storage such as an external disk. Therefore, memory usage greatly affects performance of the computer. It is especially the case for an embedded terminal. An ANDROID system is an operating system based on a LINUX kernel and oriented at a mobile terminal. All available memory of the ANDROID system is limited only to a random access memory (RAM) in the system. In the ANDROID system, when an application exits, memory occupied by the application is not cleared, and a LINUX kernel process continues to exist accordingly, that is, the application "exits but is not closed" such that a user can receive a response as soon as possible after invoking the program. When system memory is insufficient, a memory reclaiming procedure is activated.

For example, after a mobile phone is used for a period of time, there are a large quantity of system services and applications at a background. To improve user experience and reduce a start-up time, after an application is switched to the background, an operating system reserves, as much as possible, memory occupied by the application. However, due to a limited size of memory, when the memory is insufficient, if a new application is started or a new block of memory is applied for, a memory reclaiming procedure is triggered in an operating system kernel. To be specific, data of a least recently used (LRU) application is swapped out from the memory to a swap partition. In addition, when the reclaimed application is accessed again, a procedure for swapping in the application again is triggered. To be specific, the data, of the application, in the swap partition is reloaded to the memory. Therefore, during memory reclaiming in the system, page swap-in and swap-out performance directly determines a speed of application start-up or switching in the system and performance during running, and affects user experience.

Memory reclaiming plays a critical role in LINUX memory management. A current memory reclaiming policy for the LINUX kernel is as follows. When the memory is insufficient, an LRU page is reclaimed, and during memory allocation, a memory application process performs synchronous reclaiming or wakes up a kernel daemon thread to perform asynchronous reclaiming.

Because all memory reclaiming (including data compression and swap-out) procedures are currently performed in a single thread, a memory reclaiming rate is relatively low, and in a scenario in which system memory is insufficient, memory allocation performance is severely affected, and user experience is degraded.

SUMMARY

Embodiments of the present disclosure provide a memory management method and apparatus, to resolve an existing problem that a memory reclaiming rate is relatively low, severely affecting memory allocation performance in a scenario in which system memory is insufficient.

The following first describes terms appearing in the embodiments of the present disclosure.

A dedicated worker thread is a per-cpu worker thread preconfigured on each core in a multi-core CPU and running on the corresponding core. The dedicated worker thread is used to process a work task generated in the embodiments of the present disclosure. Each dedicated worker thread corresponds to one work queue. The dedicated worker thread processes a work task in the work queue on a corresponding CPU. When there is no unprocessed work task in the work queue of the dedicated worker thread, the worker thread corresponding to the work queue is in an idle state.

Write-back means writing data of a memory page back to a file system. Swap-out means swapping data of the memory page to a swap partition.

Scan control structure information (struct scan_control) is a structure used in a memory reclaiming procedure to determine information such as a total quantity of to-be-scanned page frames, whether removal of all mapping relationships of a page frame is allowed, whether write-back is allowed, and a corresponding target virtual memory area (VMA) (target_VMA), where target_VMA indicates a VMA in a process to which the page frame is mapped. Whether all the mapping relationships of the page frame need to be removed is determined based on a target_VMA field in a scan control structure. When the target_VMA field in the scan control structure is a null pointer, it indicates that all the mapping relationships of the page frame need to be removed.

A page frame descriptor (struct page) is a structure used to maintain specific information of each physical page in a memory (namely, memory page).

A flag bit (ttu_flag) is a flag used, when a mapping relationship of a page frame is removed, to determine whether to update a specified type of page frame, for example, a locked page or a page that needs to be migrated. Each type of page frame corresponds to a different flag bit. A corresponding flag bit is determined based on a type of a page frame, and whether to update translation table entry content, in a corresponding process, of the page frame is determined based on a specific value of the flag bit. For example, when the flag bit is 1, it indicates that this type of page frame is ignored, that is, translation table entry content of this type of page frame does not need to be updated. When the flag bit is 0, it indicates that translation table entry content of this type of page frame needs to be updated.

A linked list of isolated pages exists only in a process memory reclaiming procedure and is destructed after reclaiming is completed. The linked list of isolated pages is a linked list including isolated page frames. The isolated page frames are page frames isolated from an LRU linked list.

Each process corresponds to one translation table. The translation table records translation from a virtual address to a corresponding page frame. The translation table includes a plurality of levels of page directories and page tables. For example, each item in an upper-level page directory points to one middle-level page directory, each item in a middle-level page directory points to one page table, and each item in a page table points to one actual page frame.

According to a first aspect, an embodiment of the present disclosure provides a memory management method. The method may be used to swap out a memory page. The method includes determining a memory page that needs to be swapped out of a memory, for each memory page that needs to be swapped out, generating, based on the memory page, a work task used to reclaim the memory page, and determining a dedicated worker thread, and allocating each work task to the dedicated worker thread for execution. A dedicated worker thread in an idle state is selected according to a running principle of a per-cpu worker thread. Using this method, each memory page is reclaimed using a dedicated worker thread. In this way, a plurality of CPUs process memory reclaiming in parallel, thereby accelerating memory reclaiming, and improving user experience.

Based on the first aspect, in a first possible implementation, the determining a memory page that needs to be swapped out of a memory includes for each page frame in an LRU linked list in the memory, if the page frame is dirty and can be written back, or can be swapped out, determining a memory page in the page frame as the memory page that needs to be swapped out, or for each page frame in an LRU linked list in the memory, if it is determined, based on an indication, that the page frame needs to be reclaimed, and it is determined, based on scan control structure information of the memory, that all mapping relationships between the page frame and processes (processes that have mapping relationships with the page frame) need to be removed, determining a memory page in the page frame as the memory page that needs to be swapped out.

Further, whether the page frame needs to be reclaimed may be determined based on an upper-layer indication (for example, an application-layer indication). To be specific, information transferred when an upper layer is invoked to perform this embodiment of the present disclosure directly or indirectly indicates whether to forcibly reclaim the page frame, whether to remove all mapping relationships of the page frame, whether to update translation table entry content corresponding to the page frame, and the like.

Further, for each memory page that needs to be swapped out, the work task (namely, a single-page reclaiming task) corresponding to the memory page that needs to be swapped out is generated based on a specified work task format. The work task uses, as parameters, a page frame descriptor of the page frame in which the memory page is located, the scan control structure information, and a flag bit used to indicate whether to update the translation table entry content of the page frame, and uses, as a work function, a function to reclaim a single page frame. The function to reclaim a single page frame is used to perform the following processing removing all the mapping relationships between the corresponding page frame and the processes based on the page frame descriptor, the flag bit, and a target VMA field in the scan control structure, and writing data in the page frame to a swap partition or back to a file system based on the page frame descriptor, an address space corresponding to the page frame, and the scan control structure information.

The first possible implementation is applicable to a memory page reclaiming procedure in a memory allocation scenario, implements a parallel memory page swap-out procedure in a memory allocation procedure, improves page swap-out efficiency in the memory allocation procedure, increases a speed and a success ratio of memory allocation, and improves user experience.

Based on the first aspect, in a second possible implementation, the determining a memory page that needs to be swapped out of a memory includes for each specified process, traversing all levels of page directories and all page tables corresponding to VMAs of the process, and for a currently traversed VMA, determining a page frame corresponding to a page table entry corresponding to the currently traversed VMA, isolating the determined page frame from an LRU linked list, and storing the determined page frame to a linked list of isolated pages, and if a quantity of page frames in the linked list of isolated pages reaches a specified threshold or a next VMA is to be traversed, determining, as the memory page that needs to be swapped out, the page frame stored in the linked list of isolated pages.

Further, for each memory page that needs to be swapped out, the work task (namely, a multi-page reclaiming task) corresponding to the memory page that needs to be swapped out is generated based on a specified work task format. The work task uses, as parameters, the linked list of isolated pages and a VMA corresponding to the page frame in the linked list of isolated pages, and uses, as a work function, a function to reclaim a linked list of page frames.

The second possible implementation is applicable to a memory page reclaiming procedure in a specified memory reclaiming scenario, implements a procedure for swapping out, in parallel, pages corresponding to memory occupied by a process specified by an upper layer, improves efficiency in swapping out the pages corresponding to the to-be-reclaimed memory occupied by the specified process, and improves user experience.

According to a second aspect, an embodiment of the present disclosure provides a memory management method. The method may be used to swap in a memory page when a page fault occurs in an application thread. The method includes when a page fault occurs, determining that a memory page corresponding to an address of a currently accessed memory has been swapped out of the memory, generating a work task (namely, a single-page swap-in task) used to swap in the swapped-out memory page, where the work task uses, as parameters, information about a location of the swapped-out memory page in a swap partition or a swap cache, the address of the currently accessed memory, a VMA of a process to which the swapped-out memory page belongs, and a page frame allocation identifier used to allocate, in the memory, a page frame to the swapped-out memory page, and uses an asynchronous page swap-in function as a work function, and determining a dedicated worker thread, and allocating each work task to the dedicated worker thread for execution. A dedicated worker thread in an idle state is selected according to a running principle of a per-cpu worker thread.

Further, the method includes determining an adjacent page of the swapped-out memory page in the swap partition or the swap cache, for each adjacent page, generating a work task used to swap in the adjacent page, where the work task includes information about a location of the adjacent page in the swap partition or the swap cache, the address of the currently accessed memory, the VMA of the process to which the swapped-out memory page belongs, the page frame allocation identifier used to allocate, in the memory, a page frame to the swapped-out memory page, and the asynchronous page swap-in function, and determining a dedicated worker thread, and allocating each work task to the dedicated worker thread for execution. A dedicated worker thread in an idle state is selected according to a running principle of a per-cpu worker thread.

An adjacent page of a swapped-in page may be swapped in the memory using the method, thereby improving swap-in efficiency when a page fault occurs in an application process, and improving user experience.

According to a third aspect, an embodiment of the present disclosure further provides a memory management apparatus. The apparatus includes one or more modules that can implement any one of the implementations in the first aspect or the second aspect, and each module may perform one or more steps.

According to a fourth aspect, an embodiment of the present disclosure further provides a terminal device. The terminal device includes a processor and a storage. The storage is configured to store a software program. The processor is configured to read the software program stored in the storage and implement the method provided in any one of the implementations in the first aspect or the second aspect.

According to a fifth aspect, an embodiment of the present disclosure further provides a computer storage medium. The storage medium may be non-volatile, that is, content is not lost after a power failure. The storage medium stores a software program. When the software program is read and executed by one or more processors, the method provided in any one of the implementations in the first aspect or the second aspect can be implemented.

BRIEF DESCRIPTION OF DRAWINGS

FIG. 9A, FIG. 9B, FIG. 9C and FIG. 9D are schematic comparison diagrams of an effect of a memory reclaiming mechanism according to an embodiment of the present disclosure and an effect of an existing memory reclaiming mechanism;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

A memory management method provided in the embodiments of the present disclosure is mainly applied to a terminal device that uses a LINUX-kernel operating system and that has a multi-core CPU. The terminal device may also be referred to as user equipment (UE), a mobile station (MS), a mobile terminal, and the like. Optionally, the terminal may have a capability of communicating with one or more core networks through a radio access network (RAN). For example, the terminal may be a mobile phone (or referred to as a "cellular" phone) or a computer with a mobility feature. For example, alternatively, the terminal may be a portable, pocket-sized, handheld, computer built-in, or in-vehicle mobile apparatus. It should be understood that, in addition to the terminal device, the memory management method provided in the embodiments of the present disclosure may also be applied to other types of computer systems, for example, a household appliance or a server.

In the embodiments of the present disclosure, a plurality of memory pages are swapped in and/or swapped out at a software layer using a parallel processing capability of a multi-core CPU, thereby increasing speeds of swapping in and/or swapping out the memory pages, and improving user experience of an application.

Figure 1:
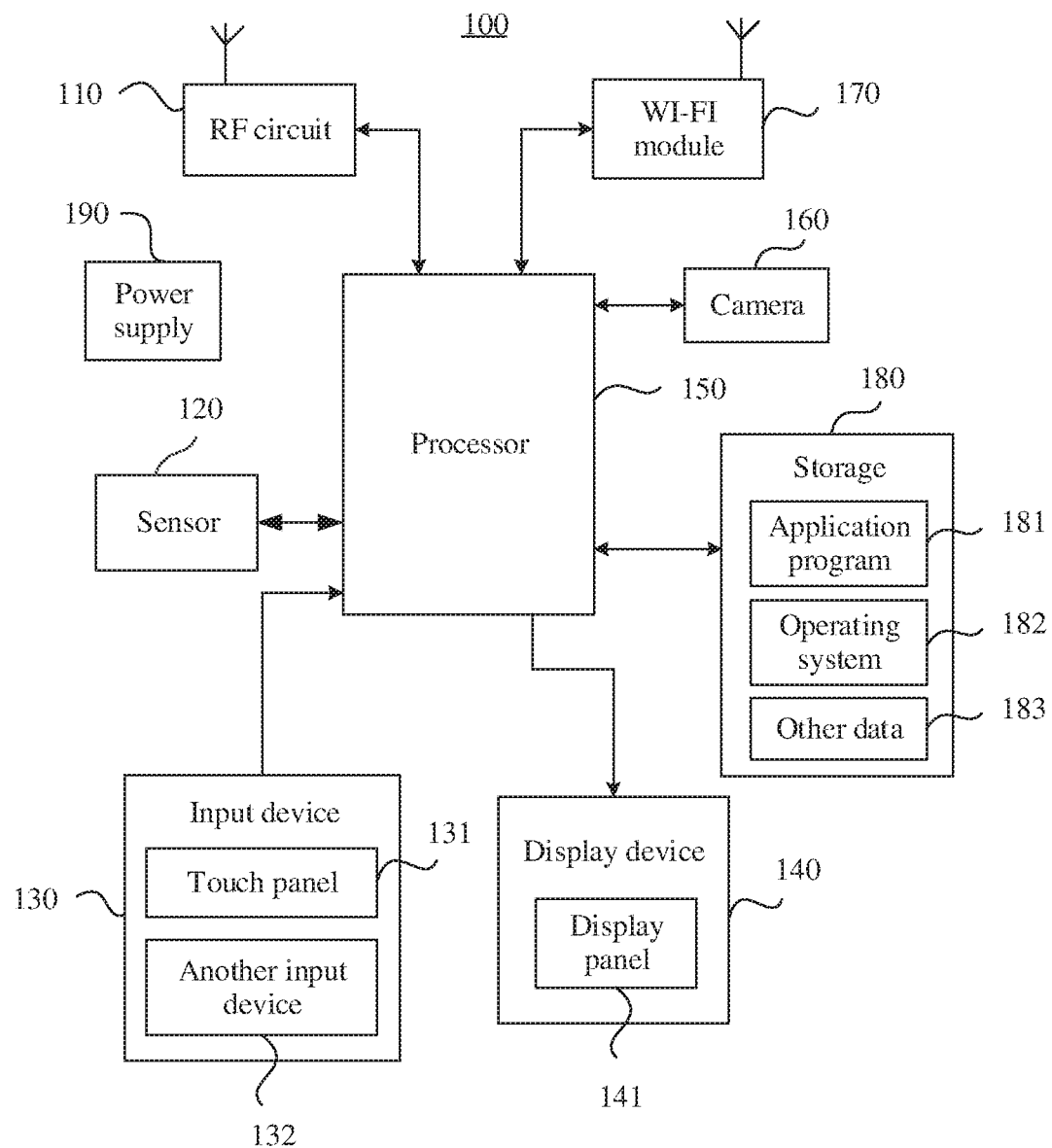
FIG. 1 is a schematic structural diagram of a terminal device to which an embodiment of the present disclosure is applied.

FIG. 1 is a schematic structural diagram of a terminal device to which an embodiment of the present disclosure is applied. As shown in FIG. 1, the terminal device 100 includes a storage 180, a processor 150, and a display device 140. The storage 180 stores a computer program, and the computer program includes an operating system 182, an application program 181, and the like. The processor 150 is configured to read the computer program in the storage 180, and then perform a method defined in the computer program. For example, the processor 150 reads the operating system 182 to run an operating system on the terminal device 100 and implement various functions of the operating system, or reads one or more application programs 181 to run an application on the terminal device.

The processor 150 may include one or more processors. For example, the processor 150 may include one or more central processing units, or include one central processing unit and one graphics processing unit. When the processor 150 includes a plurality of processors, the plurality of processors may be integrated into one chip, or each may be an independent chip. One processor may include one or more processing cores.

In addition, the storage 180 further stores other data 183 in addition to the computer program. The other data 183 may include data generated after the operating system 182 or the application program 181 is run. The data includes system data (for example, a configuration parameter of the operating system) and user data. For example, data cached in an application program started by a user is typical user data.

The storage 180 usually includes a memory and an external storage. The memory may be a RAM, a read-only memory (ROM), a cache, or the like. The external storage may be a hard disk, an optical disc, a universal serial bus (USB) flash drive, a FLOPPY DISK, a tape drive, or the like. The computer program is usually stored in the external storage. Before performing processing, the processor 150 loads the computer program from the external storage to the memory. In this embodiment of the present disclosure, a to-be-decoded file is usually stored in the external storage, and before decoding the file, the processor 150 loads the file from the external storage to the memory. According to the method provided in this embodiment of the present disclosure, fast memory page swap-in and swap-out operations are performed through parallel processing of a multi-core CPU to improve user experience.

The operating system 182 includes a computer program that can implement the memory management method provided in this embodiment of the present disclosure such that after the processor 150 reads the operating system 182 and runs the operating system, the operating system can have parallel swap-in and/or swap-out functions provided in this embodiment of the present disclosure. Further, the operating system may open, to an upper-layer application, a call interface for the parallel swap-in and/or swap-out functions. After the processor 150 reads the application program 181 from the storage 180 and runs the application, the application may call, using the call interface, parallel page swap-in and/or page swap-out functions provided in the operating system, thereby swapping in and/or swapping out memory pages in parallel.

The terminal device 100 may further include an input device 130 configured to receive entered digital information, entered character information, or an entered contact-type touch operation/non-contact-type gesture, and generate a signal input or the like related to a user setting and function control of the terminal device 100.

The terminal device 100 may further include the display device 140. The display device 140 includes a display panel 141 configured to display information entered by a user or information provided for a user, various menu interfaces of the terminal device 100, and the like. In some other embodiments, a touch panel 131 may cover the display panel 141 to form a touch display screen.

In addition, the terminal device 100 may further include a power supply 190 configured to supply power to other modules, and a camera 160 configured to shoot a photo or a video. The terminal device 100 may further include one or more sensors 120, for example, an acceleration sensor or a light sensor. The terminal device 100 may further include a radio frequency (RF) circuit 110 configured to communicate with a wireless network device through a network, and may further include a WI-FI module 170 configured to communicate with other devices through WI-FI.

The memory management method provided in the embodiments of the present disclosure is described in the following embodiments. The memory management method provided in the embodiments of the present disclosure may be implemented in the operating system 182 shown in FIG. 1.

Figure 2:
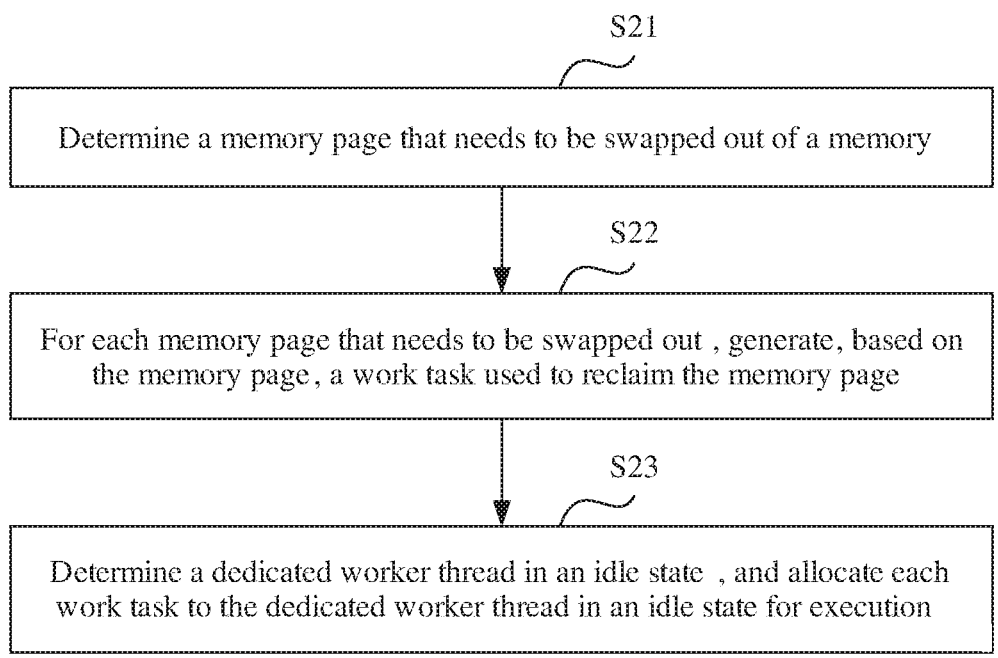
FIG. 2 is a schematic flowchart of a memory management method according to an embodiment of the present disclosure.

FIG. 2 is a schematic diagram of a memory management method according to an embodiment of the present disclosure. The method includes the following steps.

S21. Determine a memory page that needs to be swapped out of a memory.

The memory may be a RAM, a cache, or the like. A type of the memory is not limited in this embodiment of the present disclosure.

S22. For each memory page that needs to be swapped out, generate, based on the memory page, a work task used to reclaim the memory page.

S23. Determine a dedicated worker thread in an idle state, and allocate each work task to the dedicated worker thread in an idle state for execution.

One dedicated worker thread used to process a work task generated in this embodiment of the present disclosure is configured in each CPU included in a multi-core CPU. Each dedicated worker thread corresponds to one work queue, and the dedicated worker thread processes a work task in the work queue on a corresponding CPU. When there is no unprocessed work task in the work queue of the dedicated worker thread, the worker thread corresponding to the work queue is in an idle state.

According to a principle of a per-cpu work queue mechanism, if a same work task (encapsulated work task entities are the same, but the entities include different page frame descriptors or different linked lists of page frames) already exists in a work queue of a worker thread, reinsertion of the work task is not allowed, or if a same work task has been removed from a queue but has not been completely processed, insertion of the same work task is allowed at this time. Therefore, to ensure that the dedicated worker thread works continuously and a relatively balanced work task load is allocated to each dedicated worker thread, a new work task is inserted when the worker threads are in an optimal state (a worker thread is processing a work task and there is no work task that needs to be processed in a work queue of the worker thread). The idle state in this embodiment of the present disclosure means that there is no work task that needs to be processed in a work queue, and includes the optimal state.

In this embodiment of the present disclosure, the memory page that needs to be swapped out of the memory is determined, for each memory page that needs to be swapped out, the work task used to reclaim the memory page is generated based on the memory page, and the dedicated worker thread in an idle state is determined, and each work task is allocated to the dedicated worker thread in an idle state for execution. In this way, a plurality of CPUs process memory reclaiming in parallel, thereby accelerating memory reclaiming, and improving user experience.

The following describes, using three specific application scenarios, the memory management method provided in this embodiment of the present disclosure.

1. A first scenario is a memory page swap-out procedure triggered in a memory allocation scenario. For example, when an application program or a process is newly started, memory needs to be allocated to the newly started application program or the newly started process.

In this scenario, the thread for swapping out the memory page in S21 to S23 is a memory application thread or a daemon thread (kswapd).

In this scenario, the determining a memory page that needs to be swapped out of a memory in S21 includes the following two possible implementations.

Manner 1: For each page frame in an LRU linked list in the memory, if the page frame is dirty and can be written back, or can be swapped out, a memory page in the page frame is determined as the memory page that needs to be swapped out.

Write-back means writing data of a memory page back to a file system. Swap-out means swapping data of the memory page to a swap partition.

In this manner, page frames in each LRU linked list are sequentially scanned, and if the page frame is dirty and can be written back, or can be swapped out, the memory page stored in the page frame is determined as the memory page that needs to be swapped out. The page frame that can be written back and is dirty is a page frame that is modified after a file is loaded to the memory and that has not been synchronized to the file system. Whether write-back is allowed is determined based on scan control structure information. The page frame that can be swapped out means memory data, such as stack data, of a process. The page frame that can be swapped out is forcibly set to be dirty.

Manner 2: For each page frame in an LRU linked list in the memory, if it is determined, based on an indication, that the page frame needs to be reclaimed, and it is determined, based on scan control structure information of the memory, that all mapping relationships between the page frame and processes need to be removed, a memory page in the page frame is determined as the memory page that needs to be swapped out. The indication usually comes from an application at an application layer.

In this manner, the scan control structure information (struct scan_control) is a structure used in a memory reclaiming procedure to determine information such as a total quantity of to-be-scanned page frames, whether removal of all mapping relationships of a page frame is allowed, whether write-back is allowed, and a corresponding target VMA (target_VMA), where target_VMA indicates a VMA in a process to which the page frame is mapped. Whether all the mapping relationships of the page frame need to be removed is determined based on a target_VMA field in a scan control structure. When the target_VMA field in the scan control structure is a null pointer, it indicates that all the mapping relationships of the page frame need to be removed.

In this manner, whether the page frame needs to be forcibly reclaimed may be determined based on an indication of an upper layer (for example, the application layer).

In this scenario, for each memory page that needs to be swapped out, a possible implementation of the generating, based on the memory page, a work task used to reclaim the memory page in S22 includes generating, based on a specified work task format, the work task corresponding to the memory page that needs to be swapped out, where the work task uses, as parameters, a page frame descriptor of the page frame in which the memory page is located, the scan control structure information, and a flag bit used to indicate whether to update translation table entry content of the page frame, and uses, as a work function, an encapsulated function to reclaim a single page frame, and the flag bit is indicated by the upper layer.

A page frame descriptor (struct page) is a structure used to maintain specific information of each physical page in a memory (namely, memory page).

A flag bit (ttu_flag) is a flag used, when a mapping relationship of a page frame is removed, to determine whether to update a specified type of page frame, for example, a locked page or a page that needs to be migrated. Each type of page frame corresponds to a different flag bit. A corresponding flag bit is determined based on a type of a page frame, and whether to update translation table entry content, in a corresponding process, of the page frame is determined based on a specific value of the flag bit. For example, when the flag bit is 1, it indicates that this type of page frame is ignored, that is, translation table entry content of this type of page frame does not need to be updated. When the flag bit is 0, it indicates that translation table entry content of this type of page frame needs to be updated.

In this scenario, the generated work task is recorded as struct single_reclaim_info, and information related to the work task is stored. In a possible implementation, the generated work task includes <1> the page frame descriptor (page), <2> the scan control structure (sc), <3> the page type processing flag (ttu_flags), and <4> the work task frame (work). The work task (work) includes a field (func) that points to the work function.

In this scenario, the function to reclaim a single page frame is used to perform the following processing removing all the mapping relationships between the corresponding page frame and the processes based on the page frame descriptor, the flag bit, and the target_VMA field in the scan control structure, and writing data in the page frame to a swap partition or back to a file system based on the page frame descriptor, an address space (struct address_space) corresponding to the page frame, and the scan control structure information. The address space corresponding to the page frame includes a processing function corresponding to writing back or swapping this type of page frame.

The following describes in detail, using a specific embodiment, a page swap-out procedure triggered in a memory allocation procedure.

Figure 3A:
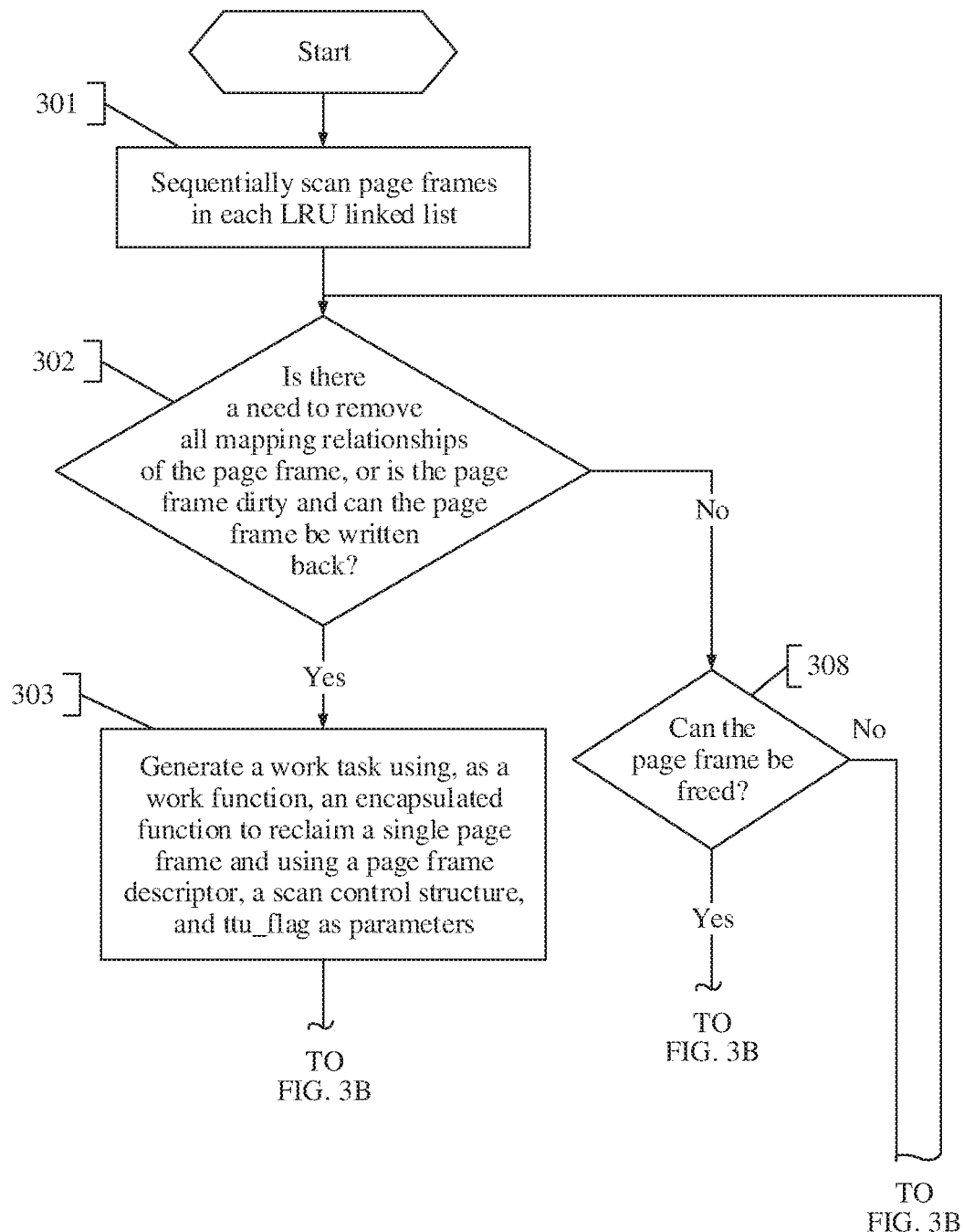
FIG. 3A and FIG. 3B are a schematic flowchart of a memory page swap-out procedure according to Embodiment 1 of the present disclosure.
Figure 3B:
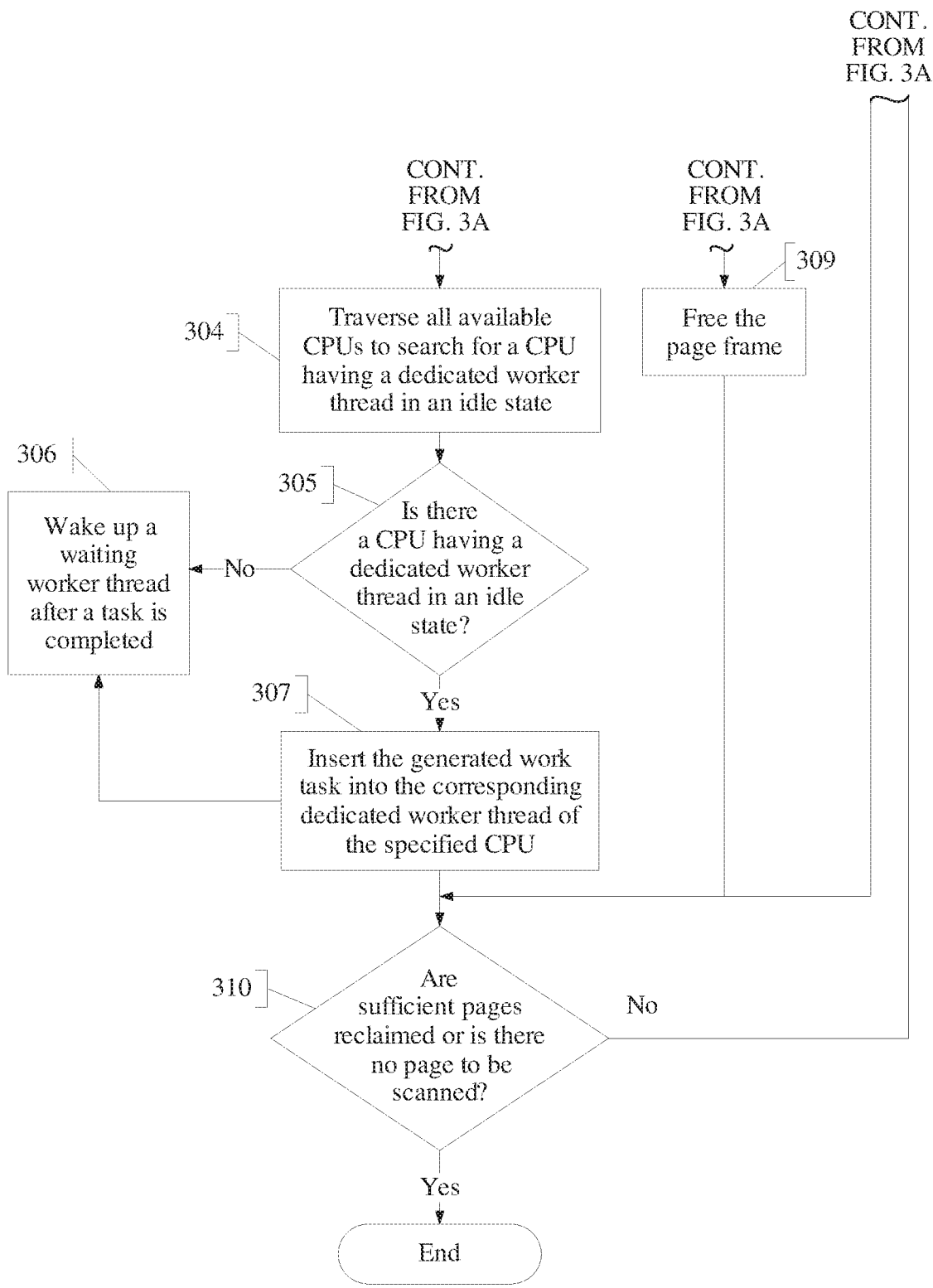

Embodiment 1: FIG. 3A and FIG. 3B are a schematic diagram of a page swap-out procedure described in this embodiment. The following procedure is included.

Step 301: Scan page frames in each LRU linked list.

Step 302: Determine whether each page frame meets a specified condition, where the specified condition includes an indication for forcible reclaiming and a need to remove all mapping relationships of the page frame, or an indication that the page frame is dirty and can be written back, or an indication that the page frame can be swapped out.

Perform step 303 if the page frame meets the specified condition.

Perform step 308 if the page frame does not meet the specified condition.

Step 303: Generate a work task corresponding to the page frame, where the work task uses a page frame descriptor (struct page), scan control structure information (struct scan_ control), and a flag bit (ttu_flag) as parameters, and uses, as a work function, an encapsulated function to reclaim a single page frame.

Step 304: Traverse all available CPUs in a system to search for a CPU having a dedicated worker thread in an idle state, that is, search for a CPU having no task in a pending state.

Step 305: Determine whether there is a CPU having a dedicated worker thread in an idle state, that is, determine whether there is a CPU having no task in a pending state.

Perform step 307 if there is a CPU having a dedicated worker thread in an idle state.

Perform step 306 if there is no CPU having a dedicated worker thread in an idle state.

Step 306: Wake up a waiting worker thread after a page reclaiming work task is completed. Continue to perform step 307.

Step 307: Select a CPU in which a current thread is not located, and insert the generated work task into a work queue of the dedicated worker thread in an idle state. Continue to perform step 310.

Step 308: Determine whether the page frame can be freed. For example, a page frame meeting all of the following conditions can be freed The page frame is not cited by or mapped to any other processes, the page frame is not dirty and is not in a written-back state, and the page frame does not point to any address space (struct address_space).

Perform step 309 if the page frame can be freed.

Perform step 310 if the page frame cannot be freed.

Step 309: Free the page frame to a memory manager.

Step 310: Determine whether current memory meets a size of memory applied for this time or currently there is no page to be scanned.

The procedure ends if the current memory meets the size of memory applied for this time or currently there is no page to be scanned.

Return to step 302 if the current memory does not meet the size of memory applied for this time or currently there is a page to be scanned.

Figure 4:
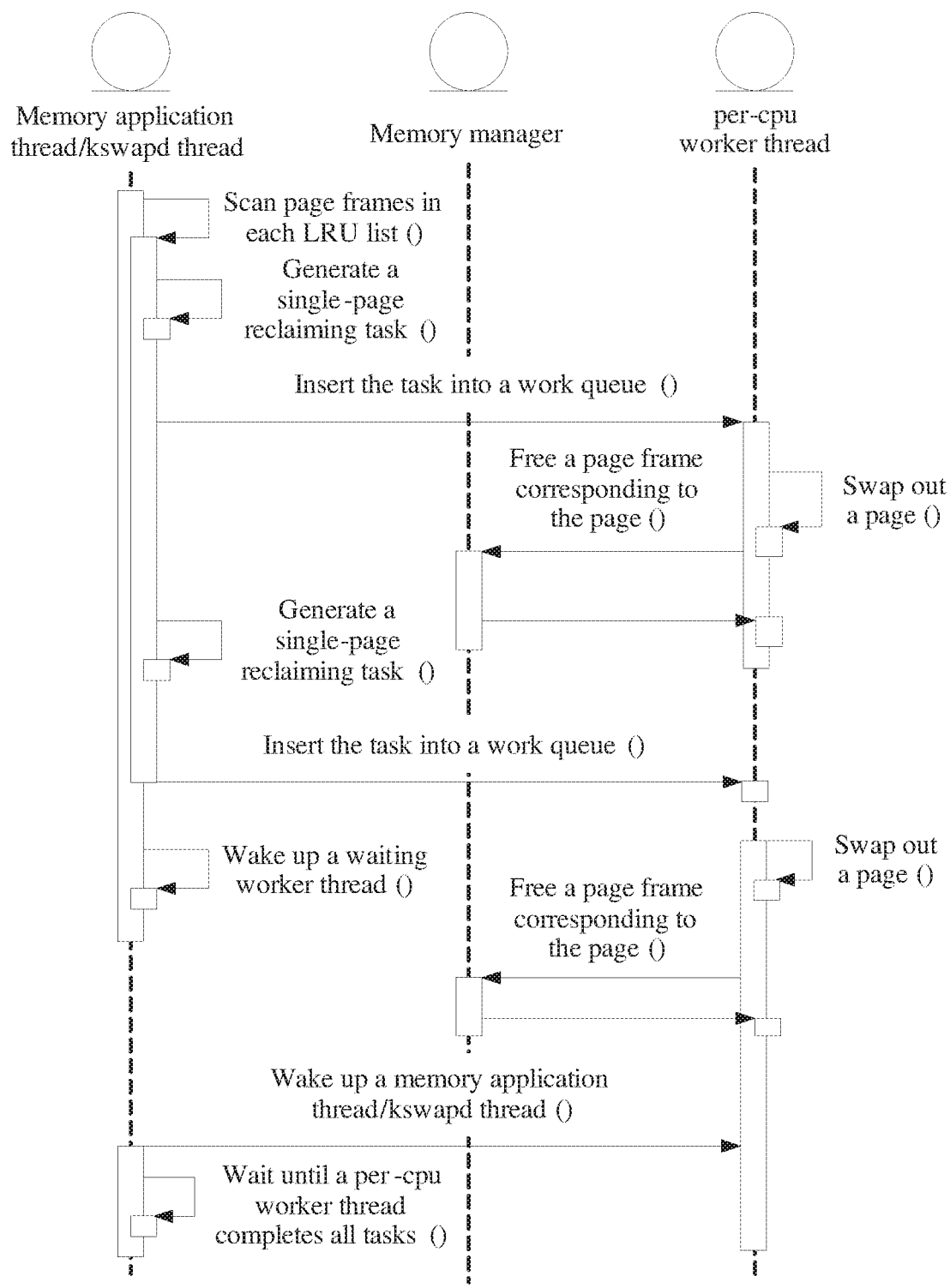
FIG. 4 is a sequence diagram of a memory page swap-out procedure according to Embodiment 1 of the present disclosure.

This embodiment is performed by a memory application thread or a daemon thread (kswapd). A sequence diagram of this embodiment is shown in FIG. 4. The memory application thread or the kswapd thread inserts a generated single-page reclaiming task into a work queue of a per-cpu worker thread. The per-cpu worker thread frees, using the memory manager, a page frame corresponding to a swapped-out page. If the memory application thread or the kswapd thread is waiting for being woken up by the worker thread, the per-cpu worker thread wakes up the memory application thread or the kswapd thread after completing a task. The running sequence diagram provided in FIG. 4 is merely an example for describing a possible embodiment of the page swap-out method provided in the present disclosure. Based on the plurality of methods described in the foregoing embodiments of the present disclosure and the example of the running sequence diagram shown in FIG. 4, persons skilled in the art can easily obtain a running sequence diagram corresponding to another page swap-out method embodiment provided in the present disclosure, and execute a corresponding program based on the sequence diagram. Details are not described herein.

2. A second scenario is a page swap-out scenario in a procedure for reclaiming memory occupied by a process in a memory. For example, when available memory in a system is less than a specified threshold, a page swap-out procedure is triggered.

In this scenario, the thread for swapping out the memory page in S21 to S23 is a memory reclaiming thread.

In this scenario, the determining a memory page that needs to be swapped out of a memory in S21 includes for each specified process, traversing all levels of page directories and all page tables corresponding to VMA of the process, for a currently traversed VMA, determining a page frame corresponding to a page table entry corresponding to the currently traversed VMA, isolating the determined page frame from an LRU linked list, and storing the determined page frame to a linked list of isolated pages, and if a quantity of page frames in the linked list of isolated pages reaches a specified threshold or a next VMA is to be traversed, determining, as the memory page that needs to be swapped out, the page frame stored in the linked list of isolated pages.

A linked list of isolated pages exists only in a process memory reclaiming procedure and is destructed after reclaiming is completed. The linked list of isolated pages is a linked list including isolated page frames. The isolated page frames are page frames isolated from an LRU linked list.

It should be noted that each process corresponds to one translation table. The translation table records translation from a virtual address to a corresponding page frame. The translation table includes a plurality of levels of page directories and page tables. For example, each item in an upper-level page directory points to one middle-level page directory, each item in a middle-level page directory points to one page table, and each item in a page table points to one actual page frame.

In this scenario, for each memory page that needs to be swapped out, a possible implementation of the generating, based on the memory page, a work task used to reclaim the memory page in S22 includes generating, based on a specified work task format, the work task corresponding to the memory page that needs to be swapped out, where the work task uses, as parameters, the linked list of isolated pages and the VMA corresponding to the page frame in the linked list of isolated pages, and uses, as a work function, a function to reclaim a linked list of page frames.

In this manner, the generated work task is recorded as struct list_reclaim_info, and information related to the work task is stored. In a possible implementation, the generated work task includes <1> the linked list of isolated pages (page_list), <2> the VMA corresponding to the page frame, and <3> the work task (work). The work task (work) includes a field (func) that points to the work function.

In this manner, a main procedure for the function to reclaim a linked list of page frames is as follows. First, the linked list of isolated pages in the work task is traversed to clear activity identifiers in page frame descriptors corresponding to all page frames. Then, the linked list of isolated pages in the work task is traversed to sequentially obtain each page frame descriptor and attempt to reclaim the page frame. Finally, an unreclaimed page frame is inserted back into the LRU linked list. The activity identifier indicates whether a page frame is in an actively accessed state, and may be used to divide page frame LRUs (into an active LRU and an inactive LRU).

The following describes in detail, using a specific embodiment, a page swap-out procedure in the procedure for reclaiming memory occupied by a process in a memory.

Figure 5A:
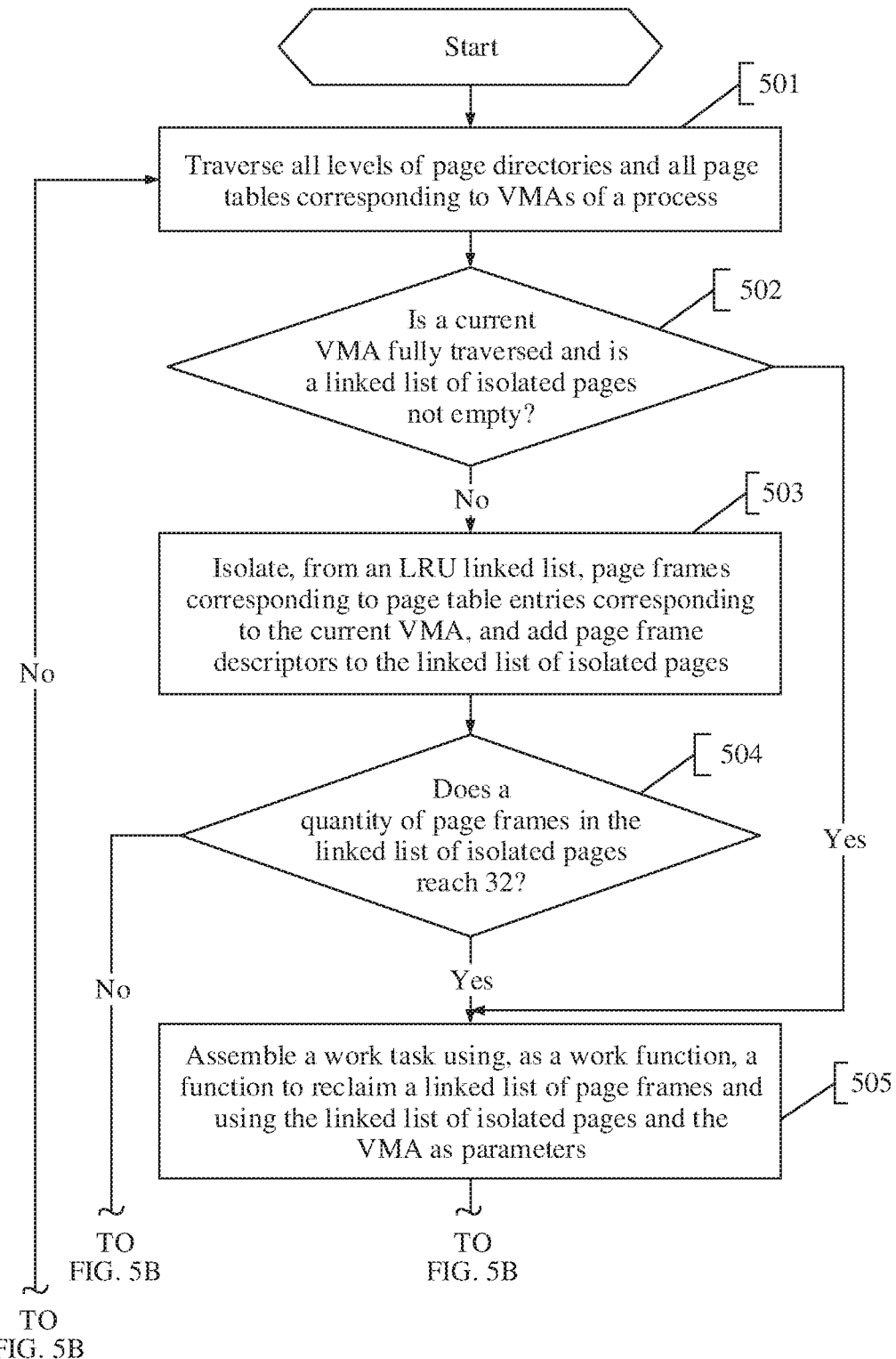
FIG. 5A and FIG. 5B are a schematic flowchart of a memory page swap-out procedure according to Embodiment 2 of the present disclosure.
Figure 5B:
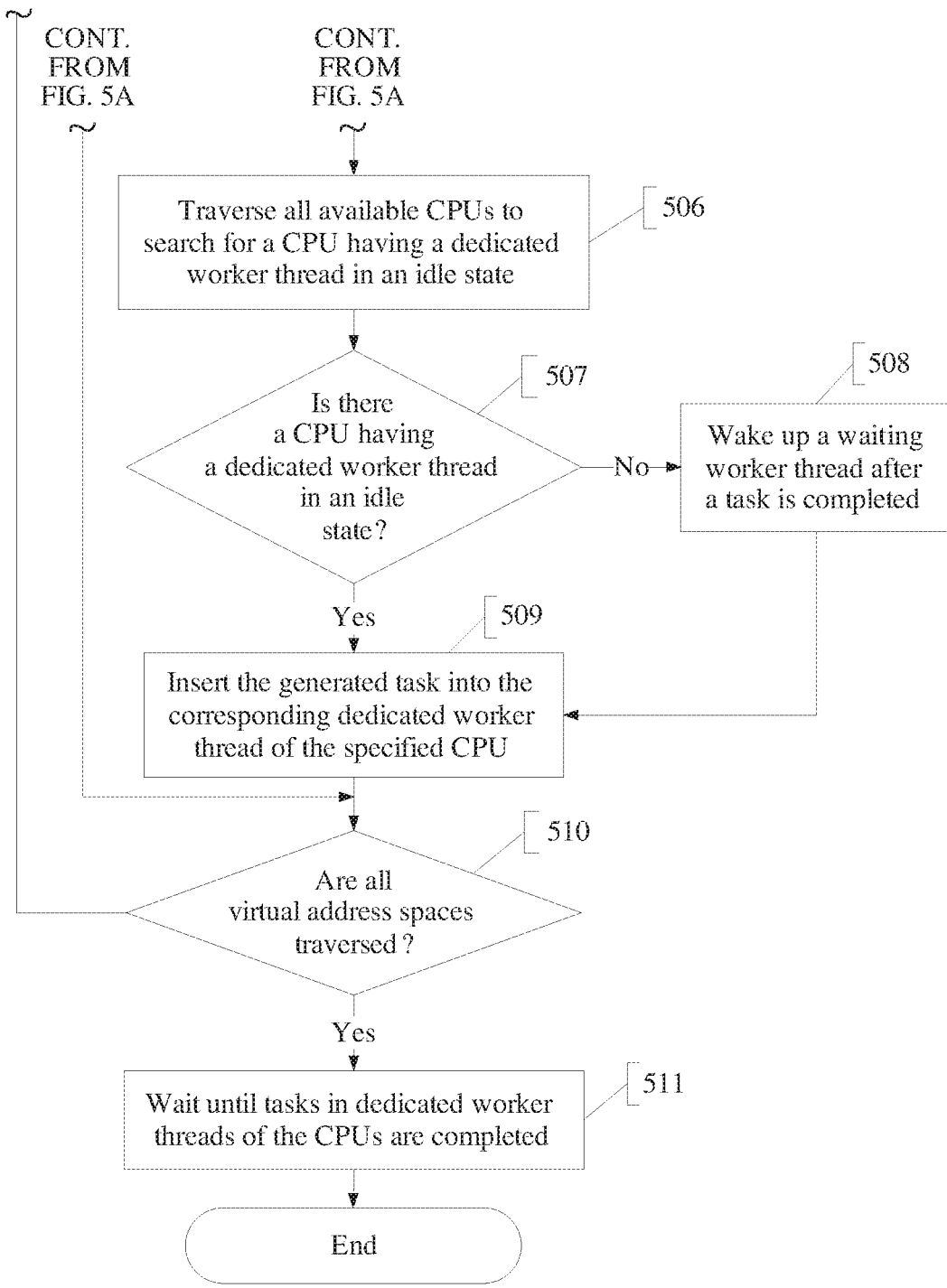

Embodiment 2: FIG. 5A and FIG. 5B are a schematic diagram of a page swap-out procedure described in this embodiment. The following procedure is included.

Step 501: Traverse all levels of page directories and all page tables corresponding to VMAs of a process, to filter out a page table entry corresponding to a page that is not in a memory.

Step 502: Determine whether a current VMA is fully traversed and a linked list of isolated pages is not empty.

Perform step 505 if the current VMA is fully traversed and the linked list of isolated pages is not empty.

Perform step 503 if the current VMA is not fully traversed or the linked list of isolated pages is empty.

Step 503: Isolate, from an LRU linked list, page frames corresponding to page table entries corresponding to the current VMA, and add page frame descriptors of the isolated page frames to the linked list of isolated pages.

Step 504: Check whether a quantity of page frames in the linked list of isolated pages reaches a quantity of pages in a single swap. The quantity of pages in a single swap is usually 32 by default.

Perform step 505 if the quantity of page frames in the linked list of isolated pages reaches the quantity of pages in a single swap.

Perform step 510 if the quantity of page frames in the linked list of isolated pages does not reach the quantity of pages in a single swap.

Step 505: Generate a work task using the linked list of isolated pages and the corresponding target_VMA (namely, the currently traversed VMA) as parameters and using, as a work function, a function to reclaim a linked list of page frames. Continue to perform step 506.

Step 506: Traverse all available CPUs in a system to search for a CPU having a dedicated worker thread in an idle state, that is, search for a CPU having no task in a pending state. Continue to perform step 507.

Step 507: Determine whether there is a CPU having a dedicated worker thread in an idle state, that is, determine whether there is a CPU having no task in a pending state.

Perform step 509 if there is a CPU having a dedicated worker thread in an idle state.

Perform step 508 if there is no CPU having a dedicated worker thread in an idle state.

Step 508: Wake up a waiting worker thread after a page reclaiming work task is completed. Continue to perform step 509.

Step 509: Select a CPU in which a current thread is not located, and insert the generated work task into a work queue of the dedicated worker thread in an idle state. Continue to perform step 510.

Step 510: Check whether all virtual address spaces of the process are traversed.

Perform step 511 if all the virtual address spaces of the process are traversed.

Return to step 501 if not all the virtual address spaces of the process are traversed.

Step 511: Wait until dedicated worker threads of the CPUs complete a memory page frame reclaiming work task.

Figure 6A:
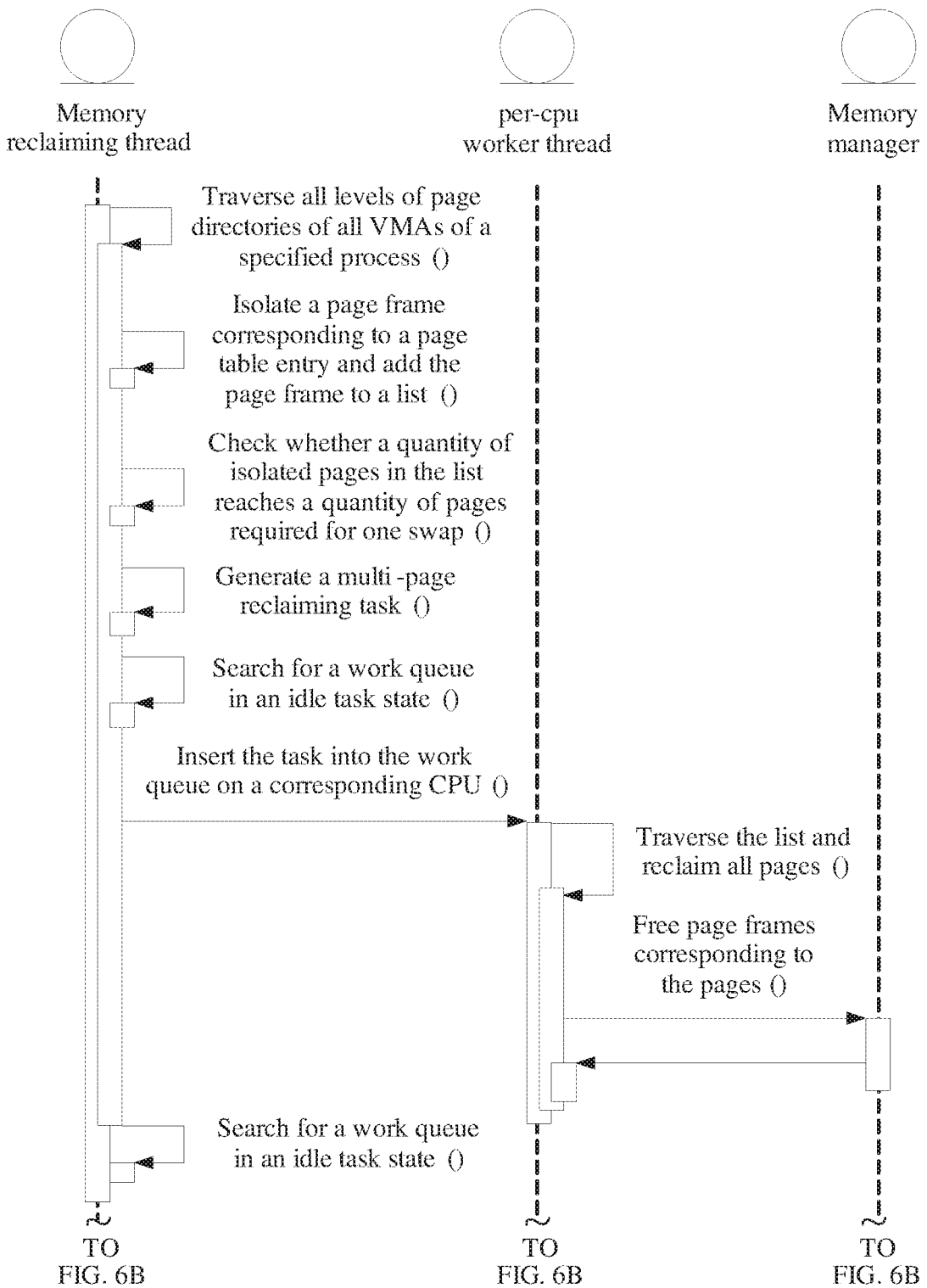
FIG. 6A and FIG. 6B are a sequence diagram of a memory page swap-out procedure according to Embodiment 2 of the present disclosure.
Figure 6B:
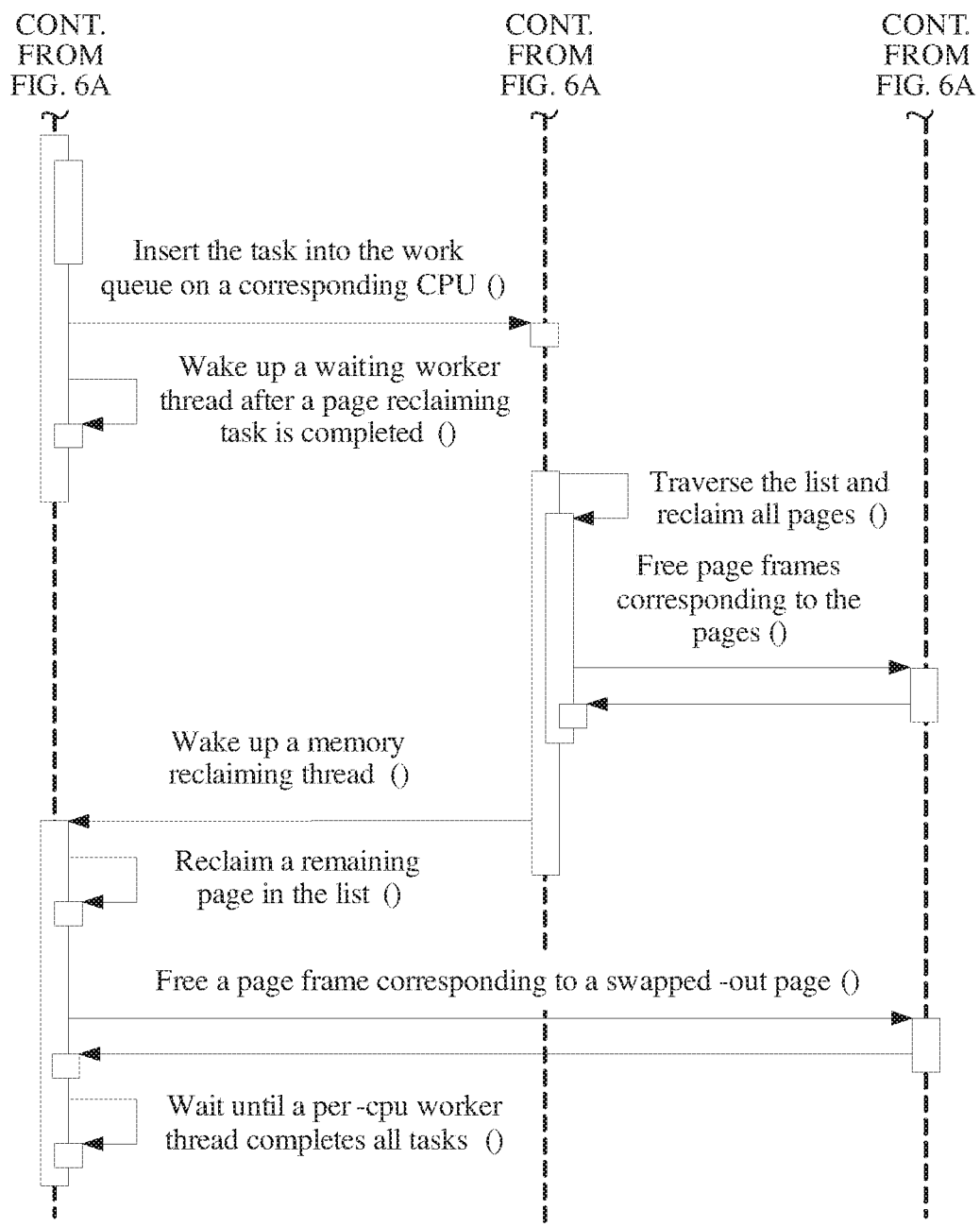

This embodiment is performed by a memory reclaiming thread. A sequence diagram of this embodiment is shown in FIG. 6A and FIG. 6B. The memory reclaiming thread inserts a multi-page reclaiming task into a work queue of a per-cpu worker thread. The per-cpu worker thread frees, using a memory manager, a page frame corresponding to a swapped-out page. If the memory reclaiming thread is waiting for being woken up by the worker thread, the per-cpu worker thread wakes up the memory reclaiming thread after completing a task. The running sequence diagram provided in FIG. 6A and FIG. 6B is merely an example for describing a possible embodiment of the page swap-out method provided in the present disclosure. Based on the plurality of methods described in the foregoing embodiments of the present disclosure and the example of the running sequence diagram shown in FIG. 6A and FIG. 6B, persons skilled in the art can easily obtain a running sequence diagram corresponding to another page swap-out method embodiment provided in the present disclosure, and execute a corresponding program based on the sequence diagram. Details are not described herein.

3. A third scenario is a page swap-in procedure triggered in a process page fault scenario.

In this scenario, the method further includes swapping in a corresponding memory page when a page fault occurs, and further includes when a page fault occurs, determining that a memory page corresponding to an address of a currently accessed memory has been swapped out of the memory, for example, is swapped out from the memory to a swap partition, or is cached from the memory to a swap cache, generating a work task used to swap in the swapped-out memory page, where the work task uses, as parameters, information about a location of the swapped-out memory page in the swap partition or the swap cache, the address of the currently accessed memory, a VMA of a process to which the swapped-out memory page belongs, and a page frame allocation identifier used to allocate, in the memory, a page frame to the swapped-out memory page, and uses an asynchronous page swap-in function as a work function, and determining, from a currently available CPU, a CPU having a dedicated worker thread in an idle state, and allocating the generated work task to the dedicated worker thread of the determined CPU for execution.

It should be noted that one page frame may be mapped to a plurality of processes, and when a page frame is reclaimed, mapping relationships between the page frame and all processes are removed. After a process swaps in a page from the swap partition, a page frame corresponding to the page is mapped to the process, and the page frame is inserted into the swap cache to prevent the page from being repeatedly swapped in from the swap partition when another process accesses the page.

In this scenario, the method further includes swapping in an adjacent page of the swapped-out memory page, and determining an adjacent page of the swapped-out memory page in the swap partition or the swap cache, for each adjacent page, generating a work task used to swap in the adjacent page, where the work task uses, as parameters, information about a location of the adjacent page in the swap partition or the swap cache, the address of the currently accessed memory, the VMA of the process to which the swapped-out memory page belongs, the page frame allocation identifier used to allocate, in the memory, a page frame to the swapped-out memory page, and uses the asynchronous page swap-in function as a work function, and determining, from a currently available CPU, a CPU having a dedicated worker thread in an idle state, and allocating each work task to the dedicated worker thread in an idle state for execution.

In this scenario, a swap partition in which an assessed page is located and a specific location of the page in the swap partition may be determined by converting a page table entry corresponding to the page into swapslot (information about a page frame in the swap partition), and the specific location includes a swap partition type and an internal offset of the swap partition. A work task used to swap in an adjacent page is generated using, as parameters, swapslot of the adjacent page of the assessed page in the swap partition, an address of an accessed process (namely, an address of a process in which an access error occurs), and a corresponding process VMA (namely, a VMA of a process in which the page with a page fault is located), and the page frame allocation identifier (gfp_mask) used to allocate, in the memory, a page frame to the swapped-out memory page, and using the asynchronous page swap-in function as a work function.

A main procedure for the asynchronous page swap-in function is as follows. First, the swap cache is searched to determine whether there is a page frame that needs to be read in, and if there is no page frame that needs to be read in, an idle page frame is allocated and inserted into the swap cache, and then data is read from a corresponding page frame in a corresponding swap partition to the newly allocated memory page frame.

The generated work task is recorded as struct single_swapin_info, and information related to the work task is stored. In a possible manner, the generated work task includes <1> information about a page frame in the swap partition (swapslot), <2> the page frame allocation identifier (gfp_mask), <3> the process VMA corresponding to the page frame, <4> the address of the accessed process (addr), and <5> the work task (work). The work task (work) includes a field (func) that points to the work function.

In this scenario, not only the memory page with a page fault but also the adjacent page in the swap partition or the swap cache in which the memory page is located is swapped in. Because a plurality of CPUs are used to process the swap-in procedure in parallel, memory page swap-in is accelerated, an instantaneous performance loss of a process with a page fault is reduced, a hot start time of an application is reduced, and user experience is improved.

The following describes in detail, using a specific embodiment, the page swap-in procedure in the process page fault scenario.

Figure 7A:
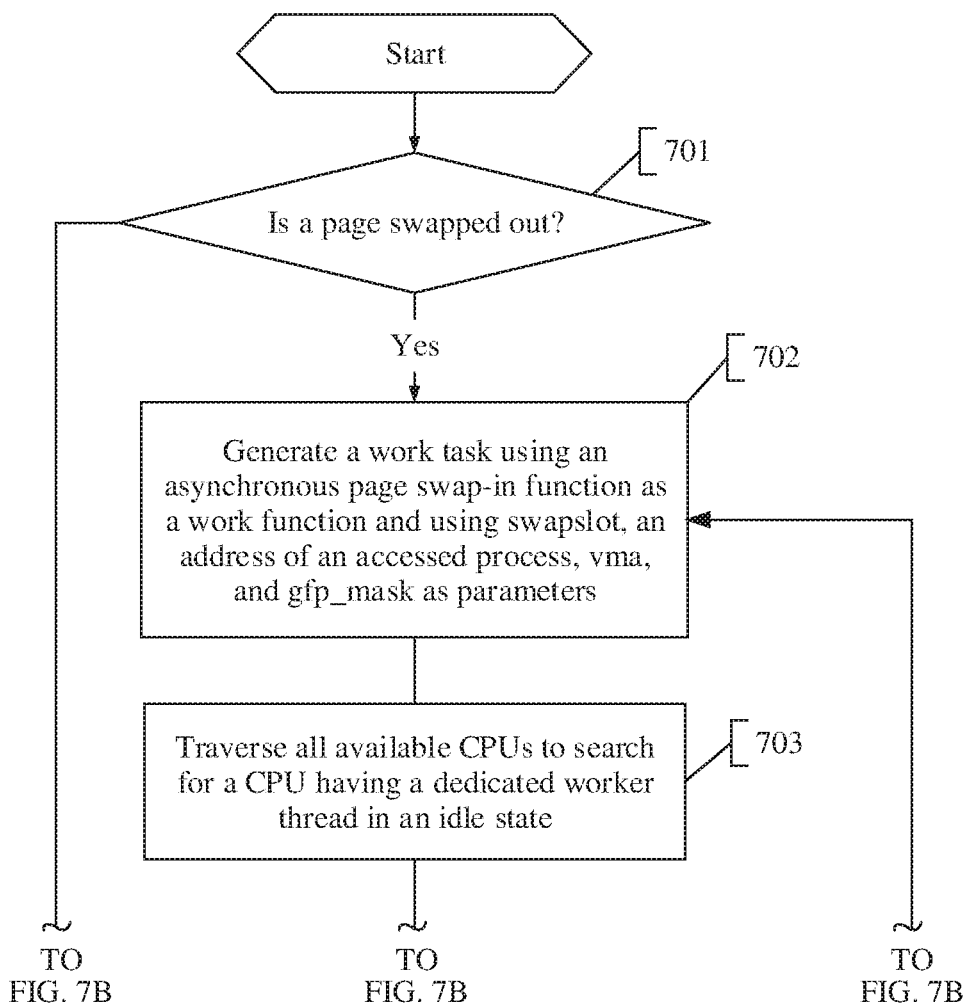
FIG. 7A and FIG. 7B are a schematic flowchart of a memory page swap-in procedure according to Embodiment 3 of the present disclosure.
Figure 7B:
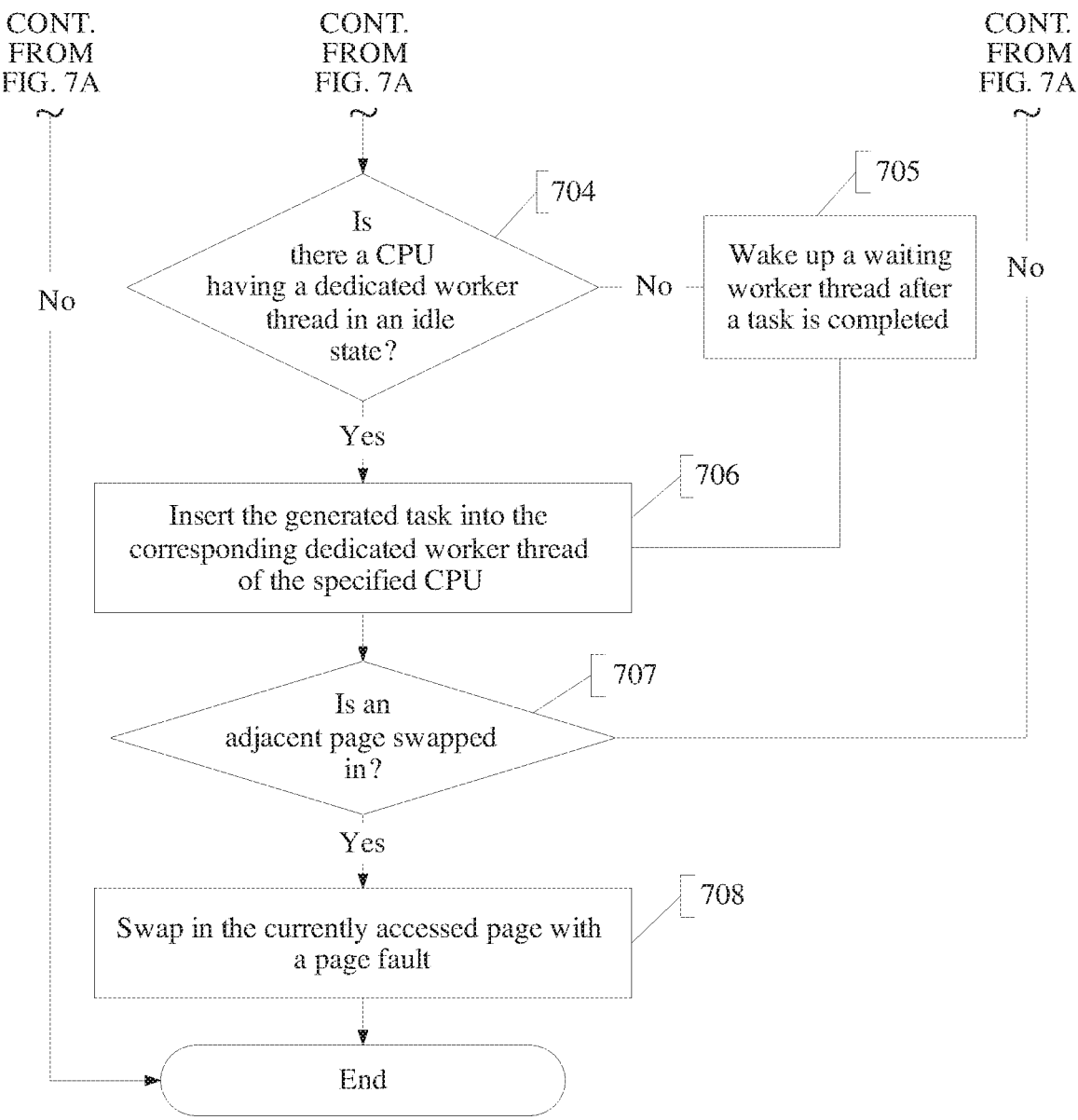

Embodiment 3: FIG. 7A and FIG. 7B are a schematic diagram of a page swap-in procedure described in this embodiment. The following procedure is included.

Step 701: During processing of a page fault, check whether a page corresponding to an address of an accessed memory is swapped out.

Perform step 702 if the page corresponding to the address of the accessed memory is swapped out.

The procedure ends if the page corresponding to the address of the accessed memory is not swapped out.

Step 702: Generate a corresponding work task using, as parameters, swapslot of an adjacent page of the swapped-out page in a swap partition, an address of an accessed process, a corresponding process VMA, and a page frame allocation identifier (gfp_mask) and using an asynchronous page swap-in function as a work function.

Step 703: Traverse all available CPUs in a system to search for a CPU having a dedicated worker thread in an idle state, that is, search for a CPU having no task in a pending state.

Step 704: Determine whether there is a CPU having a dedicated worker thread in an idle state, that is, determine whether there is a CPU having no task in a pending state.

Perform step 706 if there is a CPU having a dedicated worker thread in an idle state.

Perform step 705 if there is no CPU having a dedicated worker thread in an idle state.

Step 705: Wake up a waiting worker thread after a page swap-in work task is completed. Continue to perform step 706.

Step 706: Select a CPU in which a current thread is not located, and insert the generated work task into a work queue of the dedicated worker thread in an idle state.

Step 707: Check whether the adjacent page of the page with the page fault in the swap partition is swapped in.

Perform step 708 if the adjacent page of the page with the page fault in the swap partition is swapped in.

If the adjacent page of the page with the page fault in the swap partition is not swapped in, return to step 702 to continue to swap in the adjacent page.

Step 708: Swap in the page that causes the current page fault.

Figure 8:
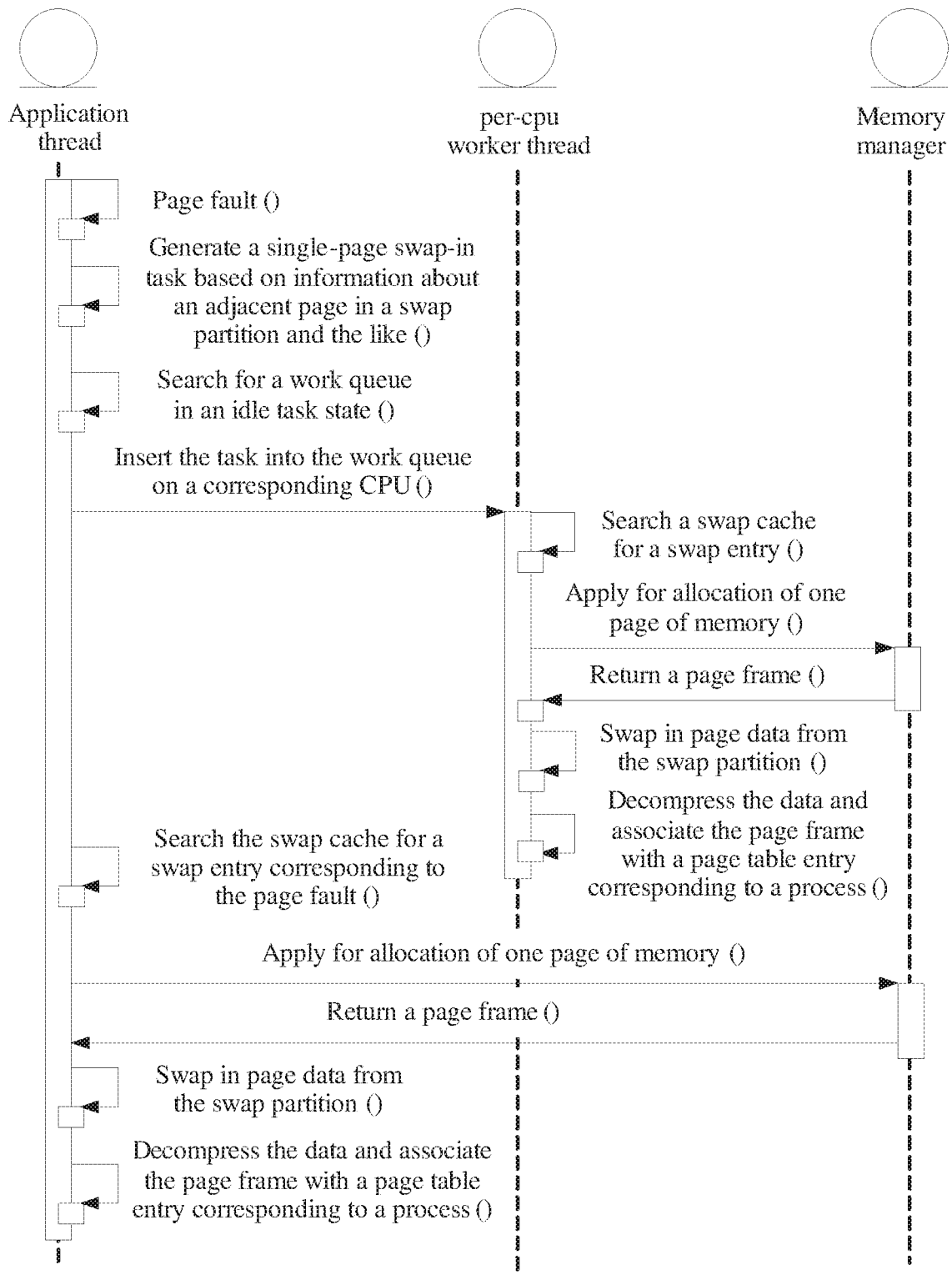
FIG. 8 is a sequence diagram of a memory page swap-in procedure according to Embodiment 3 of the present disclosure.

This embodiment is performed by a page fault processing thread. A running sequence diagram of this embodiment is shown in FIG. 8. After a page fault occurs in an application thread, the application thread inserts a single-page swap-in task into a work queue of a per-cpu worker thread, before swapping in page data, the per-cpu worker thread first allocates an idle memory page (namely, a page frame) using a memory manager, and before swapping in the page data, the application thread first allocates an idle memory page using the memory manager. The running sequence diagram provided in FIG. 8 is merely an example for describing a possible embodiment of the page swap-in method provided in the present disclosure. Based on the plurality of methods described in the foregoing embodiments of the present disclosure and the example of the running sequence diagram shown in FIG. 8, persons skilled in the art can easily obtain a running sequence diagram corresponding to another page swap-in method embodiment provided in the present disclosure, and execute a corresponding program based on the sequence diagram. Details are not described herein.

In this embodiment of the present disclosure, because a plurality of CPUs are used to perform parallel processing, a swap-out procedure and a swap-in procedure may be simultaneously performed. In this way, memory page swap-in and swap-out procedures are further accelerated, and user experience is improved.

FIGS. 9A-9D are comparison diagrams of an effect of processing page swap-out using a single thread and an effect of processing page swap-out in parallel using a plurality of threads according to an embodiment of the present disclosure. Before optimization, page swap-out is processed using a single thread. After optimization, page swap-out is processed in parallel using a plurality of threads. FIGS. 9A-9D shows a comparison between an effect of processing page swap-out using a single thread and an effect of processing page swap-out in parallel using a plurality of threads according to this embodiment of the present disclosure, in terms of an elapsed time of reclaiming (Elapsed), an amount of swapped-out data (Sectors), a quantity of reclaimed pages (Reclaim_pages), an elapsed time of reclaiming each page (Elapsed/page), an average elapsed time of reclaiming each page (Average elapsed/page), a performance improvement comparison (Performance), and the like of four different applications. It can be learned that the page swap-out processed in parallel using the plurality of threads accelerates a memory page swap-out procedure.

The foregoing mainly describes specific procedures of the methods provided in the embodiments of the present disclosure. The following describes, with reference to FIG. 10 using an ANDROID operating system as an example, implementation locations and runtime statuses of the methods provided in the embodiments of the present disclosure. For a more detailed method procedure, refer to the description in the foregoing embodiments.

Figure 10:
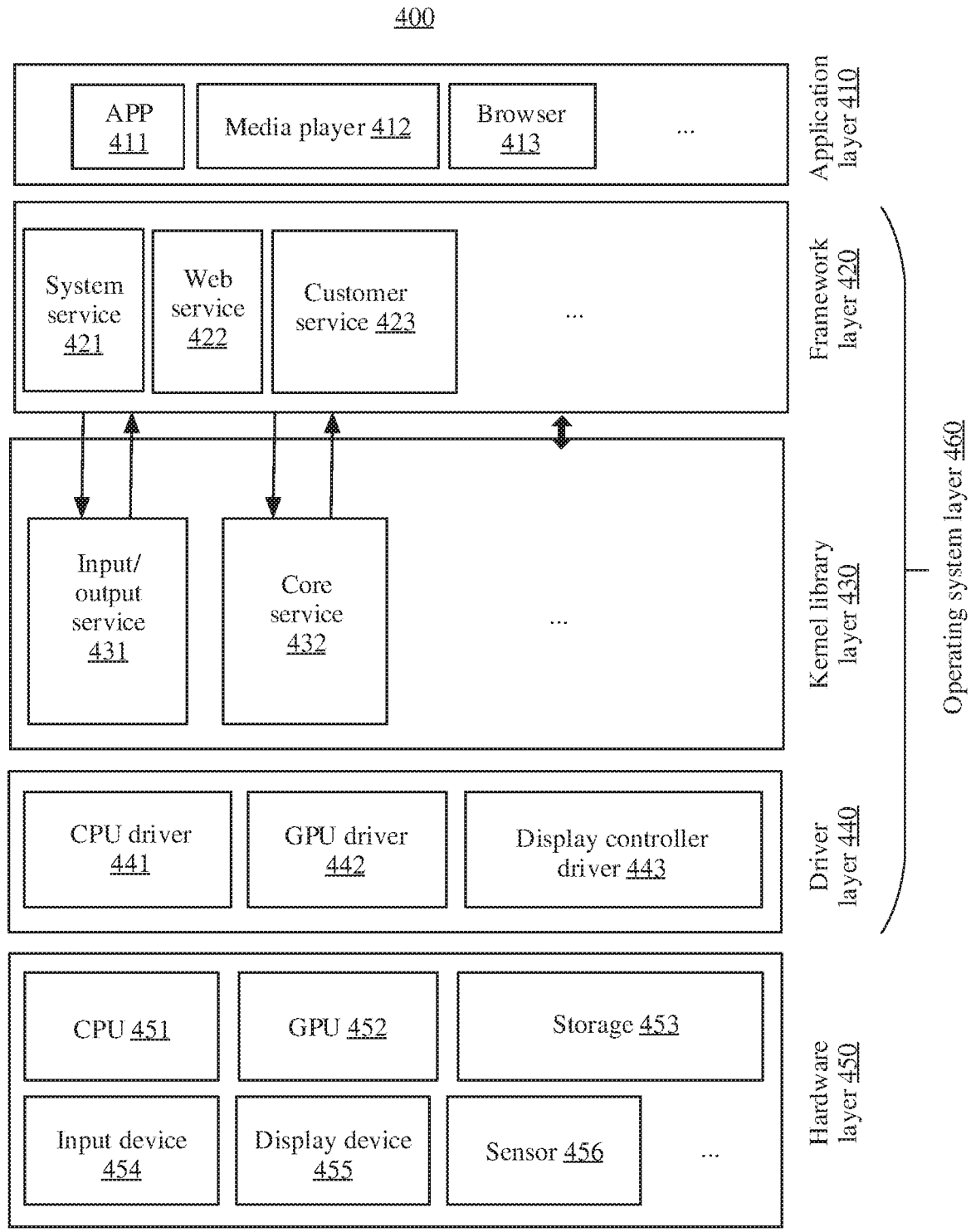
FIG. 10 is a schematic diagram in which an embodiment of the present disclosure is applied to an ANDROID operating system.

FIG. 10 is a schematic structural diagram of a computer system 400 according to an embodiment of the present disclosure. The computer system 400 may be a terminal device, or may be another type of computer device. The computer system includes an application layer 410 and an operating system layer 460. An operating system running in the operating system layer 460 may be an ANDROID operating system. The operating system layer 460 is further divided into a framework layer 420, a kernel library layer 430, and a driver layer 440. The operating system layer 460 in FIG. 10 may be considered as a specific implementation of the operating system 182 in FIG. 1, and the application layer 410 in FIG. 10 may be considered as a specific implementation of the application program 181 in FIG. 1. The driver layer 440 includes a CPU driver 441, a graphics processing unit (GPU) driver 442, a display controller driver 443, and the like. The kernel library layer 430 is a core part of the operating system and includes an input/output service 431, a core service 432, and the like. The framework layer 420 may include a system service 421, a web service 422, a customer service 423, and the like. The application layer 410 may include an APP 411, a media player 412, a browser 413, and the like.

In addition, below the driver layer 440, the computer system 400 further includes a hardware layer 450. The hardware layer of the computer system 400 may include a CPU 451 and a GPU 452 (equivalent to a specific implementation of the processor 150 in FIG. 1), may further include a storage 453 (equivalent to the storage 180 in FIG. 1) that includes a memory and an external storage, may further include an input device 454 (equivalent to another input device 132 in FIG. 1) and a display device 455 (equivalent to the display device 140 in FIG. 1), for example, a liquid crystal display (LCD), a holographic imaging device, or a projector, and may further include one or more sensors 456 (equivalent to the sensor 120 in FIG. 1). Certainly, in addition, the hardware layer 450 may further include the power supply, the camera, the RF circuit, and the WI-FI module shown in FIG. 1, and may further include other hardware modules not shown in FIG. 1, for example, a memory controller and a display controller.

The method provided in any one of the foregoing embodiments of the present disclosure may be implemented at the operating system layer 460 shown in FIG. 10.

It can be learned from the foregoing apparatus and method that, according to the computer system to which the parallel swap-in and/or swap-out methods provided in the embodiments of the present disclosure are applied, parallel memory page swap-in and/or swap-out can be implemented to improve memory page swap-in and swap-out efficiency and also effectively avoid system stalling, thereby improving user experience.

Figure 11:
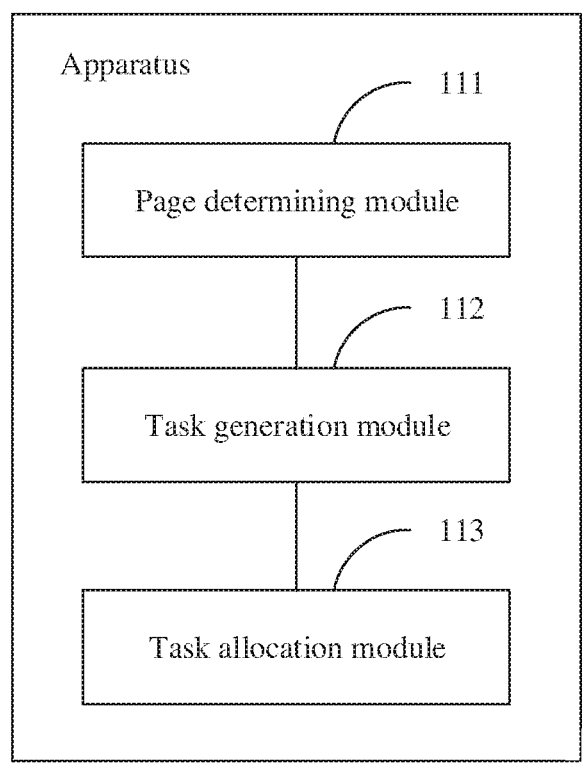
FIG. 11 is a schematic diagram of a memory management apparatus according to an embodiment of the present disclosure.

FIG. 11 shows a memory management apparatus according to an embodiment of the present disclosure. The apparatus includes a page determining module 111 configured to determine a memory page that needs to be swapped out of a memory, a task generation module 112 configured to for each memory page that needs to be swapped out, generate, based on the memory page, a work task used to reclaim the memory page, and a task allocation module 113 configured to determine a dedicated worker thread in an idle state, and allocate each work task to the dedicated worker thread in an idle state for execution.

In a possible implementation, the page determining module 111 is further configured to for each page frame in an LRU linked list in the memory, if the page frame is dirty and can be written back, or can be swapped out, determine a memory page in the page frame as the memory page that needs to be swapped out, or for each page frame in an LRU linked list in the memory, if it is determined, based on an indication, that the page frame needs to be reclaimed, and it is determined, based on scan control structure information of the memory, that all mapping relationships between the page frame and processes need to be removed, determine a memory page in the page frame as the memory page that needs to be swapped out.

Further, the task generation module 112 is further configured to generate, based on a specified work task format, the work task-corresponding to the memory page that needs to be swapped out, where the work task includes a page frame descriptor of the page frame in which the memory page is located, the scan control structure information, a flag bit used to indicate whether to update translation table entry content of the page frame, and a function to reclaim a single page frame, and the function to reclaim a single page frame is used to perform the following processing removing all the mapping relationships between the corresponding page frame and the processes based on the page frame descriptor, the flag bit, and a target VMA field in the scan control structure, and writing data in the page frame to a swap partition or back to a file system based on the page frame descriptor, an address space corresponding to the page frame, and the scan control structure information.

Based on the foregoing procedure, a parallel memory page swap-out procedure is implemented in a memory allocation procedure, page swap-out efficiency in the memory allocation procedure is improved, a speed and a success ratio of memory allocation are increased, and user experience is improved.

In another possible implementation, the page determining module 111 is further configured to for each specified process, traverse all levels of page directories and all page tables corresponding to VMAs of the process, and for a currently traversed VMA, determine a page frame corresponding to a page table entry corresponding to the currently traversed VMA, isolate the determined page frame from an LRU linked list, and store the determined page frame to a linked list of isolated pages, and if a quantity of page frames in the linked list of isolated pages reaches a specified threshold or a next VMA is to be traversed, determine, as the memory page that needs to be swapped out, the page frame stored in the linked list of isolated pages.

Further, the task generation module 112 is further configured to generate, based on a specified work task format, the work task corresponding to the memory page that needs to be swapped out, where the work task includes the linked list of isolated pages, the VMA corresponding to the page frame in the linked list of isolated pages, and a function to reclaim a linked list of page frames.

Based on the foregoing procedure, a procedure for swapping out, in parallel, pages corresponding to memory occupied by a process specified by an upper layer is implemented, efficiency in swapping out the pages corresponding to the to-be-reclaimed memory occupied by the specified process is improved, and user experience is improved.

Based on any one of the foregoing embodiments, the page determining module 111 is further configured to, when a page fault occurs, determine that a memory page corresponding to an address of a currently accessed memory has been swapped out of the memory.

The task generation module 112 is further configured to generate a work task used to swap in the swapped-out memory page. The work task includes information about a location of the swapped-out memory page in a swap partition or a swap cache, the address of the currently accessed memory, a VMA of a process to which the swapped-out memory page belongs, a page frame allocation identifier used to allocate, in the memory, a page frame to the swapped-out memory page, and an asynchronous page swap-in function.

The task allocation module 113 is further configured to determine a dedicated worker thread in an idle state, and allocate each work task to the dedicated worker thread in an idle state for execution.

When a page swap-in operation needs to be performed, the page determining module 111, the task generation module 112, and the task allocation module 113 may be triggered to perform parallel swap-in processing on the foregoing memory page in order to improve page swap-in efficiency, and improve user experience.

Further, the page determining module 111 is further configured to determine an adjacent page of the swapped-out memory page in the swap partition or the swap cache.

The task generation module 112 is further configured to, for each adjacent page, generate a work task used to swap in the adjacent page, where the work task includes information about a location of the adjacent page in the swap partition or the swap cache, the address of the currently accessed memory, the VMA of the process to which the swapped-out memory page belongs, the page frame allocation identifier used to allocate, in the memory, a page frame to the swapped-out memory page, and the asynchronous page swap-in function.

The task allocation module 113 is further configured to determine a dedicated worker thread in an idle state, and allocate each work task to the dedicated worker thread in an idle state for execution.

When page swap-in processing is performed, the adjacent page of the page in the swap partition or the swap cache may be further swapped in the memory, to improve swap-in efficiency when a page fault occurs in an application process, and improve user experience.

The apparatus provided in this embodiment of the present disclosure may simultaneously perform parallel swap-out processing and parallel swap-in processing on memory pages, or may separately perform parallel swap-out processing on memory pages and parallel swap-in processing on memory pages.

The foregoing apparatus embodiment is merely an example. The units described as separate parts may or may not be physically separated, and parts shown as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided in the present disclosure, connection relationships between modules indicate that the modules have communication connections with each other, which may be implemented as one or more communications buses or signal cables. Persons of ordinary skill in the art may understand and implement the embodiments of the present disclosure without creative efforts.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a magnetic disk storage, a compact disc ROM (CD-ROM), an optical storage, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each procedure and/or each block in the flowcharts and/or the block diagrams, and a combination of a procedure and/or a block in the flowcharts and/or the block diagrams. These computer program instructions may be provided for a general-purpose computer, a dedicated computer, an embedded processor, or a processor of another programmable data processing device to generate a machine such that the instructions executed by a computer or a processor of another programmable data processing device generate an apparatus for implementing a specified function in one or more procedures in the flowcharts and/or in one or more blocks in the block diagrams.

These computer program instructions may be stored in a computer readable storage that can instruct the computer or another programmable data processing device to work in a specific manner such that the instructions stored in the computer readable storage generate an artifact that includes an instruction apparatus. The instruction apparatus implements a specified function in one or more procedures in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specified function in one or more procedures in the flowcharts and/or in one or more blocks in the block diagrams.

Although some embodiments of the present disclosure have been described, persons skilled in the art can make changes and modifications to these embodiments once they learn the basic inventive concept. Therefore, the following claims are to be construed as to cover the preferred embodiments and all changes and modifications falling within the scope of the present disclosure.

Obviously, persons skilled in the art can make various modifications and variations to the present disclosure without departing from the spirit and scope of the present disclosure. In this way, the present disclosure is intended to cover these modifications and variations in the present disclosure provided that these modifications and variations fall within the scope of the claims and their equivalent technologies of the present disclosure.

What is claimed is:

1. A memory management method comprising:
   traversing, for at least one process, page tables corresponding to virtual memory areas (VMAs) of the at least one process by
      determining, for a currently traversed VMA, a page frame corresponding to each page table entry stored in page tables corresponding to the currently traversed VMA; and
      isolating the page frame to a linked list of isolated pages;
   determining memory pages in page frames stored in the linked list of isolated pages as the memory pages that need to be swapped out of a memory when a quantity of the page frames stored in the linked list of isolated pages reaches a threshold or a next VMA is to be traversed;
   generating, for each memory page that needs to be swapped out, a work task reclaiming a corresponding memory page; and
   allocating each work task to a dedicated worker thread for execution.

2. The memory management method of claim 1, further comprising:
   determining memory pages in at least one of the following kinds of page frames which is in a least recently used (LRU) linked list as the memory pages that need to be swapped out of the memory:
   a page frame that is dirty and that is to be written back;
   a page frame that is to be swapped out; or
   a page frame that needs to be reclaimed based on an indication from an application and all mapping relationships between the page frame that needs to be reclaimed and processes need to be removed based on scan control structure information of the memory.

3. The memory management method of claim 2, wherein the work task comprises a page frame descriptor of the page frame in which the memory page is located, the scan control structure information, a flag bit indicating whether to update translation table entry content of the page frame, and a function to reclaim a single page frame, and wherein the function to reclaim the single page frame comprises:
  removing all the mapping relationships between the page frame and the processes based on the page frame descriptor, the flag bit, and a target virtual memory area (VMA) field in the scan control structure information; and
  writing data in the page frame to a swap partition or back to a file system based on the page frame descriptor, an address space corresponding to the page frame, and the scan control structure information.

4. The memory management method of claim 1, wherein the work task comprises the linked list of isolated pages, the currently traversed VMA corresponding to the page frames in the linked list of isolated pages, and a function to reclaim the linked list of isolated pages.

5. The memory management method of claim 1, wherein allocating each work task to the dedicated worker thread comprises allocating each work task to a preset dedicated worker thread.

6. The memory management method of claim 5, wherein the preset dedicated worker thread is a per-cpu worker thread, and wherein the per-cpu worker thread is a thread preconfigured on each core in a multi-core central processing unit (CPU).

7. The memory management method of claim 1, wherein the work task comprises a page frame descriptor of the page frame in which the memory page is located, the scan control structure information, a flag bit indicating whether to update translation table entry content of the page frame, and a function to reclaim a single page frame.

8. A computer system, comprising:
  a storage medium configured to store a software program; and
  one or more processors coupled to the storage medium, wherein the software program causes the one or more processors to be configured to:
    traverse, for at least one process, page tables corresponding to virtual memory areas (VMAs) of the at least one process, wherein, to traverse the page tables, the software program causes the one or more processors to be configured to:
      determine, for a currently traversed VMA, a page frame corresponding to each page table entry stored in page tables corresponding to the currently traversed VMA; and
      isolate the page frame to a linked list of isolated pages;
    determine memory pages in page frames stored in the linked list of isolated pages as the memory pages that need to be swapped out of a memory when a quantity of the page frames stored in the linked list of isolated pages reaches a threshold or a next VMA is to be traversed;
    generate, for each memory page that needs to be swapped out, a work task reclaiming a corresponding memory page; and
    allocate each work task to a dedicated worker thread for execution.

9. The computer system of claim 8, wherein the software program further, causes the one or more processors to be configured to determine memory pages in at least one of the following kinds of page frames which is in a least recently used (LRU) linked list as the memory pages that need to be swapped out of the memory:
  a page frame that is dirty and that is to be written back;
  a page frame that is to be swapped out; or
  a page frame that needs to be reclaimed based on an indication from an application and mapping relationships between the page frame that needs to be reclaimed and processes need to be removed based on scan control structure information of the memory.

10. The computer system of claim 9, wherein the work task comprises a page frame descriptor of the page frame in which the memory page is located, the scan control structure information, a flag bit indicating whether to update translation table entry content of the page frame, and a function to reclaim a single page frame, and wherein the software program further causes the one or more processors to be configured to:
  remove the mapping relationships between the corresponding page frame and the processes based on the page frame descriptor, the flag bit, and a target virtual memory area (VMA) field in the scan control structure information; and
  write data in the page frame to a swap partition or back to a file system based on the page frame descriptor, an address space corresponding to the page frame, and the scan control structure information.

11. The computer system of claim 8, wherein the work task comprises the linked list of isolated pages, the currently traversed VMA corresponding to the page frames in the linked list of isolated pages, and a function to reclaim the linked list of isolated pages.

12. The computer system of claim 8, wherein the software program further causes the one or more processors to be configured to allocate each of the work tasks to a preset dedicated worker thread.

13. The computer system of claim 12, wherein the preset dedicated worker thread is a per-cpu worker thread, and wherein the per-cpu worker thread is a thread preconfigured on each core in a multi-core central processing unit (CPU).

14. The computer system of claim 8, wherein the work task comprises a page frame descriptor of the page frame in which the memory page is located, the scan control structure information, a flag bit indicating whether to update translation table entry content of the page frame, and a function to reclaim a single page frame.

15. A computer program product comprising computer-executable instructions for storage on a non-transitory computer-readable medium that, when executed, cause a computer system to:
  traverse, for at least one process, page tables corresponding to virtual memory areas (VMAs) of the at least one process, wherein to traverse the page tables, the computer-executable instructions further cause the computer system to:
    determine, for a currently traversed VMA, a page frame corresponding to each page table entry stored in page tables corresponding to the currently traversed VMA; and
    isolate the page frame to a linked list of isolated pages;
  determine memory pages in page frames stored in the linked list of isolated pages as the memory pages that need to be swapped out of a memory when a quantity of the page frames stored in the linked list of isolated pages reaches a threshold or a next VMA is to be traversed;
  generate, for each memory page that needs to be swapped out, a work task reclaiming a corresponding memory page; and
  allocate at least two of the work tasks separately to at least two dedicated worker threads for execution.

16. The non-volatile storage medium of claim 15, wherein the computer-executable instructions further cause the computer system to determine memory pages in at least one of the following kinds of page frames which is in a least recently used (LRU) linked list as the memory pages that need to be swapped out of the memory:
 a page frame that is dirty and that is to be written back;
 a page frame that is to be swapped out; or
 a page frame that needs to be reclaimed based on an indication from an application and mapping relationships between the page frame that needs to be reclaimed and processes need to be removed based on scan control structure information of the memory.

17. The non-volatile storage medium of claim 16, wherein the work task comprises a page frame descriptor of the page frame in which the memory page is located, the scan control structure information, a flag bit indicating whether to update translation table entry content of the page frame, and a function to reclaim a single page frame, and wherein the computer-executable instructions further cause the computer system to:
 remove the mapping relationships between the page frame and the processes based on the page frame descriptor, the flag bit, and a target virtual memory area (VMA) field in the scan control structure information; and
 write data in the page frame to a swap partition or back to a file system based on the page frame descriptor, an address space corresponding to the page frame, and the scan control structure information.

18. The non-volatile storage medium of claim 15, wherein the computer-executable instructions further cause the computer system to allocate each of the work tasks to a preset dedicated worker thread, wherein the preset dedicated worker thread is a per-cpu worker thread, and wherein the per-cpu worker thread is a thread preconfigured on each core in a multi-core central processing unit (CPU).

19. The non-volatile storage medium of claim 15, wherein the work task comprises the linked list of isolated pages, the currently traversed VMA corresponding to the page frames in the linked list of isolated pages, and a function to reclaim the linked list of isolated pages.

20. The non-volatile storage medium of claim 15, wherein the work task comprises a page frame descriptor of the page frame in which the memory page is located, the scan control structure information, a flag bit indicating whether to update translation table entry content of the page frame, and a function to reclaim a single page frame.

* * * * *